United States Patent
Hashimoto et al.

(10) Patent No.: US 9,646,374 B2
(45) Date of Patent: May 9, 2017

(54) LINE WIDTH ERROR OBTAINING METHOD, LINE WIDTH ERROR OBTAINING APPARATUS, AND INSPECTION SYSTEM

(71) Applicant: NuFlare Technology, Inc., Yokohama (JP)

(72) Inventors: Hideaki Hashimoto, Kanagawa (JP); Hideki Nukada, Kanagawa (JP); Kazuhiko Inoue, Kanagawa (JP)

(73) Assignee: NuFlare Technology, Inc., Yokohama (JP)

(*) Notice: Subject to any disclaimer, the term of this patent is extended or adjusted under 35 U.S.C. 154(b) by 0 days.

(21) Appl. No.: 15/051,744

(22) Filed: Feb. 24, 2016

(65) Prior Publication Data

US 2016/0247267 A1    Aug. 25, 2016

(30) Foreign Application Priority Data

Feb. 25, 2015  (JP) ................. 2015-035796

(51) Int. Cl.
  *G06K 9/00*  (2006.01)
  *G06T 7/00*  (2017.01)

(52) U.S. Cl.
  CPC .... *G06T 7/001* (2013.01); *G06T 2207/30148* (2013.01)

(58) Field of Classification Search
  CPC ..... G06T 7/001; G06T 7/0006; G06T 7/0044; G06T 7/0085; G06T 2207/10152; G06T 2207/30148

USPC .............. 382/141, 144; 348/86, 92
See application file for complete search history.

(56) References Cited

U.S. PATENT DOCUMENTS 7,466,854 B2   12/2008  Sawa et al.
9,036,896 B2    5/2015  Touya et al.

FOREIGN PATENT DOCUMENTS

| JP | 2003-214820 | 7/2003 |
|---|---|---|
| JP | 3824542 | 9/2006 |
| JP | 2011-196728 | 10/2011 |
| JP | 2011-221264 | 11/2011 |
| JP | 4834244 | 12/2011 |

*Primary Examiner* — Daniel Mariam
(74) *Attorney, Agent, or Firm* — Oblon, McClelland, Maier & Neustadt, L.L.P.

(57) ABSTRACT

Optical image data is acquired by irradiating a pattern with light emitted from a light source. A threshold value is specified by internally dividing a minimum value and a maximum value of a signal amount of reference image data by a division ratio. A position corresponding to a signal amount of a threshold value is determined as an edge of a pattern of the reference image data. A position of a signal amount equal to the threshold value is determined as an edge of the pattern of the optical image data. A line width error is obtained as a difference between a first line width of the optical image data and a second line width of the reference image data. A new threshold value is specified in the case of fluctuation of a light quantity of the light source or decrease of a contrast value of the optical image data.

18 Claims, 14 Drawing Sheets

Position along the X-Direction

LINE WIDTH ERROR OBTAINING METHOD, LINE WIDTH ERROR OBTAINING APPARATUS, AND INSPECTION SYSTEM

CROSS-REFERENCE TO THE RELATED APPLICATION

The entire disclosure of the Japanese Patent Application No. 2015-035796, filed on Feb. 25, 2015 including specification, claims, drawings, and summary, on which the Convention priority of the present application is based, are incorporated herein in its entirety.

FIELD OF THE INVENTION

The present invention relates to a line width error of a pattern formed in a sample obtaining method, a line width error of a pattern formed in a sample obtaining apparatus, and an inspection system.

BACKGROUND

In a production process of a semiconductor element, an original pattern in which a circuit pattern is formed, that is, a mask or a reticle (hereinafter collectively referred to as a mask) is exposed and transferred onto a wafer by a reduction projection exposure apparatus called a stepper or a scanner. Since production of a Large Scale Integration (LSI) requires a large manufacturing cost, it is crucial to improve the production yield, however, a defect of a mask pattern can be cited as a large factor of degradation in the production yield of a semiconductor element. Accordingly, it is important to detect a defect in an inspection process during a mask production process.

Further, it is also important to measure a line width (CD) of a pattern formed in a mask; generate a map of a distribution of a difference value (line width error: ΔCD) between the measured value of the line width and the design value of the pattern; and feed back the map to the mask production process. According to a conventional method, a line width for each pixel is measured based on an optical image of a pattern and a reference image generated from design data of the pattern. For example, in a case where the pattern is a line pattern, one edge to be a starting point for a measurement of a line width of the pattern, and another edge corresponding to that edge, to be an ending point for the measurement of the line width of the pattern, are respectively detected with an accuracy of one pixel or less. Then, the line width is obtained by measuring a distance between these edges (see Japanese Laid-Open Patent Publication No. 2003-214820).

With high integration and large capacity of a Large Scale Integration (LSI), a circuit dimension required for a semiconductor element has become increasingly narrowed. That is, a pattern of the LSI to be formed on a semiconductor wafer has become finer, and a pattern to be formed on a mask has also become finer. When the pattern becomes finer, it is difficult to accurately obtain a line width of the pattern, and as a result, a value of a line width error may become larger than an actual value of the line width error. Further, an optical image of the mask is acquired by irradiating the mask with light from a light source, wherein the light is transmitted through the mask or reflected by the mask, into a sensor. In this case, when a light quantity of the light source fluctuates, the value of the line width error will be different to the actual value of the line width error.

The present invention has been made in view of the above-mentioned problems. That is, an object of the present invention is to provide a line width error of a pattern formed in a sample obtaining method that can accurately obtain a line width error.

Further, another object of the present invention is to provide a line width error of a pattern formed in a sample obtaining apparatus that can accurately obtain a line width error.

Further, another object of the present invention is to provide an inspection system including a function that can accurately obtain a line width error.

Other challenges and advantages of the present invention are apparent from the following description.

SUMMARY OF THE INVENTION

According to one aspect of the present invention, a method for obtaining a line width error of a pattern formed in a sample includes acquiring optical image data of a pattern formed in a sample by irradiating the pattern with light emitted from a light source, and causing the light transmitted through the sample or reflected by the sample to be incident on a sensor. Reference image data is generated corresponding to the optical image data from design data of the pattern. A threshold value is specified by internally dividing a minimum value and a maximum value of a signal amount of the reference image data by a division ratio. A position is determined as an edge of the pattern of the reference image data corresponding to the signal amount of the threshold value. A position of the signal amount equal to the threshold value is determined as an edge of the pattern of the optical image data. An edge pair is detected consisting of an edge as a starting point for a measurement of a first line width, and another edge as an ending point of the measurement of the first line width. The first line width of the pattern is obtained using the edge pair of the optical image data. A line width error is obtained as a difference between the first line width and second line width of the pattern obtained using an edge pair of the reference image data corresponding to the edge pair of the optical image data. A new threshold value is specified in the case of fluctuation of a light quantity of the light source or decrease of a contrast value of the optical image data, and a position of the signal amount equal to the new threshold value is determined as an edge of the pattern of the optical image data.

According to another aspect of the present invention, a method for obtaining a line width error of a pattern formed in a sample includes acquiring optical image data of a pattern formed in a sample by irradiating the pattern with light emitted from a light source, and causing the light transmitted through the sample or reflected by the sample to be incident on a sensor. Reference image data is generated corresponding to the optical image data from design data of the pattern. A threshold value is specified by internally dividing a minimum value and a maximum value of a signal amount of the reference image data by a division ratio. A position is determined as an edge of the pattern of the reference image data corresponding to the signal amount of the threshold value. A position of the signal amount equal to the threshold value is determined as an edge of the pattern of the optical image data. An edge pair is detected consisting of an edge as a starting point for a measurement of any line width of the pattern, and another edge as an ending point of the measurement of the line width. A plurality of line widths having different design values of the pattern is obtained using the edge pair of the optical image data. A line width range including at least one of the line widths of the pattern is specified. A pattern is extracted having a line width included in the line width range. A line width error is obtained as a difference between a first line width included in the line width range, and a second line width of the pattern of the reference image data corresponding to the optical image data of the pattern having the first line width. A new line width range is specified in the case of fluctuation of a light quantity of the light source or decrease of a contrast value of the optical image data.

According to another aspect of the present invention, an apparatus for obtaining a line width error of a pattern formed in a sample includes a table, a position measuring unit, an illumination optical system, an imaging unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The line width error obtaining unit specifies a position of the signal amount of the optical image data equal to a threshold value by internally dividing a minimum value and a maximum value of the signal amount of a reference image data generated from design data of the pattern, by a division ratio, as an edge of the pattern of the optical image data. The line width error obtaining unit further detects an edge pair consisting of an edge as a starting point for a measurement of a first line width, and another edge as an ending point of the measurement of the first line width, obtains the first line width of the pattern of the optical image data using the edge pair, and further obtains a line width error as a difference between the first line width and a second line width of the pattern obtained using an edge pair of the reference image data corresponding to the edge pair of the optical image data. The light quantity sensor detects a fluctuation of light quantity of the light source. The line width error obtaining unit further specifies a new threshold value in the case where the light quantity sensor detects the fluctuation of the light quantity of the light source, and further determines a position of the signal amount equal to the new threshold value as an edge of the pattern of the optical image data.

According to another aspect of the present invention, an apparatus for obtaining a line width error of a pattern formed in a sample includes a table, a position measuring unit, an illumination optical system, an imaging unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The line width error obtaining unit specifies a position of a signal amount of the optical image data, equal to a threshold value by internally dividing a minimum value and a maximum value of the signal amount of a reference image data generated from design data of the pattern, by a division ratio, as an edge of the pattern of the optical image data, and detects an edge pair consisting of an edge as a starting point for a measurement of any line width of the pattern, and another edge as an ending point of the measurement of the line width, and obtain a plurality of line widths with different design value of the pattern using the edge pairs of the optical image data to specify a line width range including at least one of the line widths, and obtains a line width error as a difference between a first line width included in the line width range, and a second line width of the pattern of the reference image data corresponding to the optical image data of the pattern having the first line width. The line width error obtaining unit further detects an edge pair consisting of an edge as a starting point for a measurement of a first line width, and another edge as an ending point of the measurement of the first line width, obtains the first line width of the pattern of the optical image data using the edge pair, and further obtains a line width error as a difference between the first line width and a second line width of the pattern obtained using an edge pair of the reference image data corresponding to the edge pair of the optical image data. The light quantity sensor detects a fluctuation of light quantity of the light source. The line width error obtaining unit further specifies a new threshold value in the case where the light quantity sensor detects the fluctuation of the light quantity of the light source, and further determines a position of the signal amount equal to the new threshold value as an edge of the pattern of the optical image data.

According to another aspect of the present invention, an inspection system includes a table, a position measuring unit, an illumination optical system, an imaging unit, a reference image data generating unit, a comparison unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The reference image data generating unit generates reference image data corresponding to the optical image data from design data of the pattern. The comparison unit compares the optical image data of the pattern with the reference image data of the pattern, and further determines the existence of a defect in the case where a difference value between the optical image and the reference image is larger than a predetermined threshold value. The line width error obtaining unit specifies a position of the signal amount of the optical image data equal to a threshold value by internally dividing a minimum value and a maximum value of the signal amount of a reference image data, by a division ratio, as an edge of the pattern of the optical image data. The line width error obtaining unit further detects an edge pair consisting of an edge as a starting point for a measurement of a first line width, and another edge as an ending point of the measurement of the first line width, and further obtains the first line width of the pattern of the optical image data using the edge pair, and further obtains a line width error as a difference between the first line width and a second line width of the pattern obtained using an edge pair of the reference image data corresponding to the edge pair of the optical image data. A light quantity sensor detects a fluctuation of light quantity of the light source. The line width error obtaining unit further specifies a new threshold value in the case of the light quantity sensor detecting the fluctuation of the light quantity of the light source, and determines a position of the signal amount equal to the new threshold value as an edge of the pattern of the optical image data.

According to another aspect of the present invention, an inspection system includes a table, a position measuring unit, an illumination optical system, an imaging unit, a reference image data generating unit, a comparison unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The reference image data generating unit generates reference image data corresponding to the optical image data from design data of the pattern. The comparison unit compares the optical image data of the pattern with the reference image data of the pattern, and further determines the existence of a defect in the case where a difference value between the optical image and the reference image is larger than a predetermined threshold value. The line width error obtaining unit specifies a position of a signal amount of the optical image data equal to a threshold value by internally dividing a minimum value and a maximum value of the signal amount of a reference image data generated from design data of the pattern, by a division ratio, as an edge of the pattern of the optical image data, and detects an edge pair consisting of an edge as a starting point for a measurement of any line width of the pattern, and another edge as an ending point of the measurement of the line width, and obtains a plurality of line widths with different design value of the pattern using the edge pairs of the optical image data to specify a line width range including at least one of the line widths, and obtain a line width error as a difference between a first line width included in the line width range, and a second line width of the pattern of the reference image data corresponding to the optical image data of the pattern having the first line width. A light quantity sensor detects a fluctuation of light quantity of the light source. The line width error obtaining unit further specifies a new threshold value in the case of the light quantity detecting the fluctuation of the light quantity of the light source, and determines a position of the signal amount equal to the new threshold value as an edge of the pattern of the optical image data.

BRIEF DESCRIPTION OF THE DRAWINGS

A more complete appreciation of the present invention and many of the advantages thereof will be readily obtained as the present invention becomes better understood by reference to the following detailed description, when considered in connection with the accompanying drawings, wherein.

DETAILED DESCRIPTION OF THE EMBODIMENT

Figure 1:
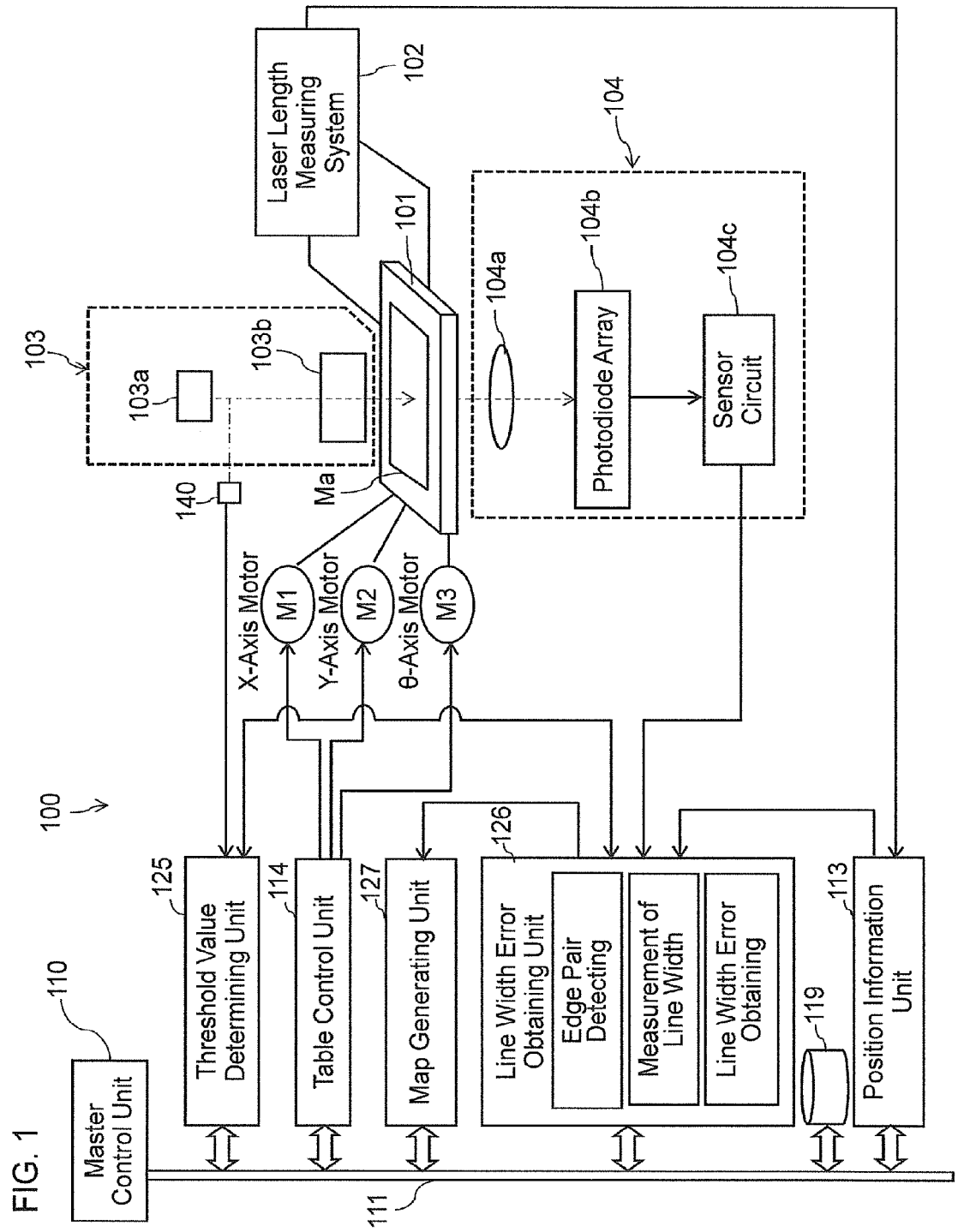
FIG. 1 is a schematic configuration diagram of a line width error obtaining apparatus according to the first embodiment.

The embodiments will now be described with reference to the accompanying drawings, wherein the same reference numerals designate corresponding or identical elements throughout the various drawings.

First Embodiment

FIG. 1 is a schematic configuration diagram of a line width error obtaining apparatus 100 according to the first embodiment. The line width error obtaining apparatus 100 obtains an optical image of an inspection target, and then obtains a line width error ($\Delta$CD) of the inspection target using the optical image to generate a line width error map ($\Delta$CD map). The main constituent components of the line width error obtaining apparatus 100 are as follows.

The line width error obtaining apparatus 100 includes a table 101 that is movable in a horizontal direction (X-direction and Y-direction) and a rotational direction ($\theta$-direction), a laser length measuring system 102 that measures position coordinates of the table 101, an illumination optical system 103 utilizing a light source 103a that illuminates a mask Ma which is a sample, positioned on the table 101, an imaging unit 104 that generates optical image data of the mask Ma, and a light quantity sensor 140 that detects the light quantity of a light source 103a of the illumination optical system 103. In the mask Ma, a pattern whose line width error is to be measured, hereinafter sometimes referred to as a pattern to be measured, is formed on a principal surface of a transparent substrate, for example, a glass substrate.

The table 101 is driven by an X-axis motor M1, a Y-axis motor M2, and a $\theta$-axis motor M3 that are controlled by a table control unit 114.

The laser length measuring system 102 constitutes a position measuring unit according to the present invention. Although a detailed illustration of the laser length measuring system 102 is omitted, it may include a laser interferometer such as a heterodyne interferometer, as one example. The laser interferometer measures position coordinates of the table 101 by illuminating or receiving laser light between each mirror provided along the X-axis and the Y-axis of the table 101. The measured data is sent from the laser length measuring system 102 to a position information unit 113. A method of measuring the position coordinates of the table 101 is not limited to the use of the laser interferometer, that is, as another example, a method using a magnetic or optical liner encoder can be applied.

The illumination optical system 103 includes the light source 103a, and a magnifying optical system 103b. A beam with predetermined characteristics is irradiated onto the mask Ma from the illumination optical system 103. If necessary, the magnifying optical system 103b may include a unit for dividing an illumination light from the light source 103a into either an optical path for illuminating the mask Ma by transmitting and/or another optical path for illuminating the mask Ma by reflecting, and a unit for changing the illumination light from the light source 103a to a circular polarization light or a linear polarization light etc., and/or a unit for changing the shape of the light source 103a to a point light source shape or a circular light source shape.

The imaging unit 104 includes a condenser lens 104a that images an optical image of the pattern of the mask Ma by condensing the illumination light transmitted or reflected by the mask Ma, a photodiode array 104b that performs photoelectric conversion on this optical image, a sensor circuit 104c that converts an analog signal output from the photodiode array 104b to a digital signal that is optical image data, and then outputs the optical image data. In the imaging unit 104, for example, a TDI (Time Delay Integration) sensor can be used. The imaging unit 104 may be configured such that a focal point is automatically adjusted by an automatic focusing mechanism (not shown).

Further, the line width error obtaining apparatus 100 includes a master control unit 110 controlling the whole of the line width error obtaining apparatus 100; a bus 111 that constitutes a data transmission line; a threshold value determining unit 125, a line width error obtaining unit 126, a map generating unit 127, and a magnetic disk device 119 as an example of a storage unit that connects to the master control unit 110 through the bus 111. Further, the above-mentioned position information unit 113 and the table control unit 114 are also connected to the master control unit 110 through the bus 111.

Next, an example of a method for obtaining the line width error of the pattern of the mask Ma using the line width error obtaining apparatus 100 shown in FIG. 1 will be described.

Figure 2:
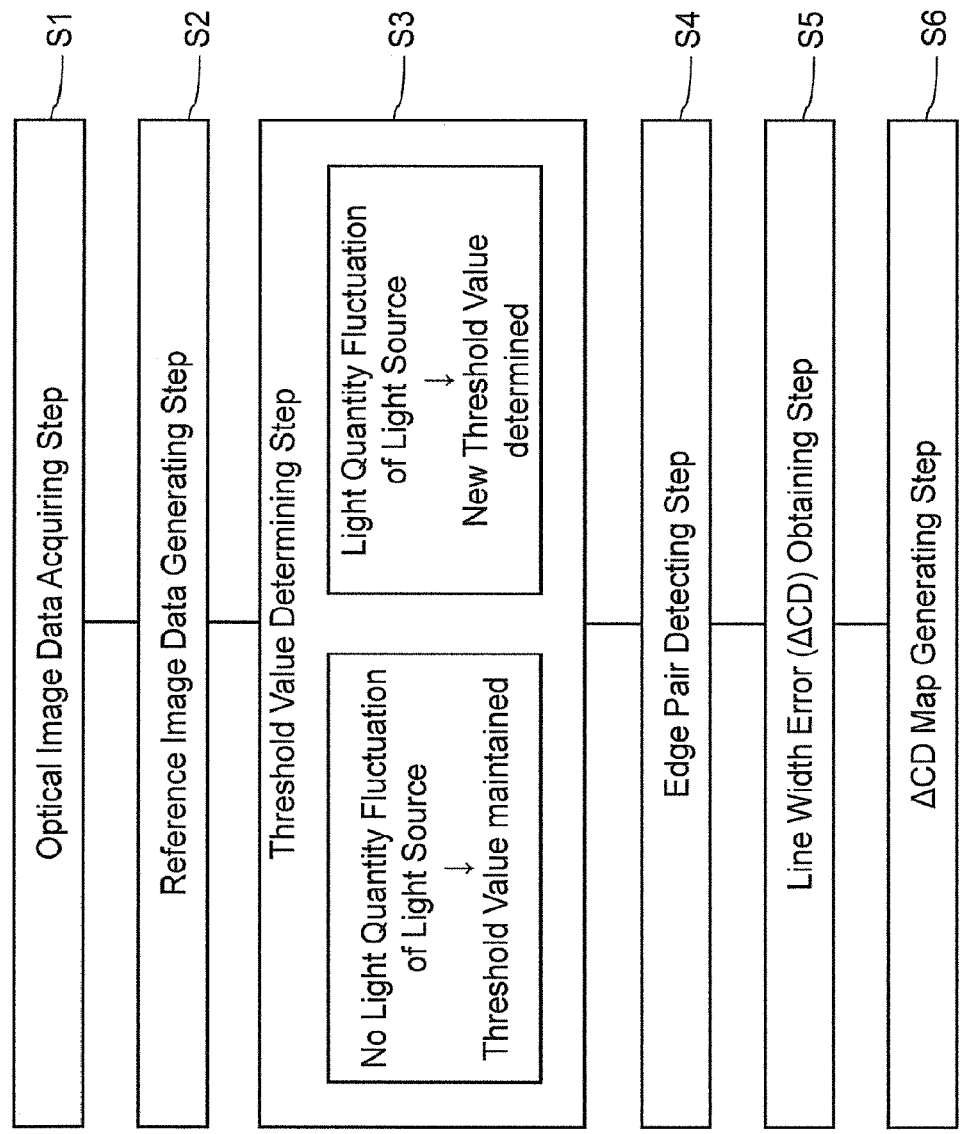
FIG. 2 illustrates an example of a flow chart illustrating a line width obtaining method according to the first embodiment.

FIG. 2 illustrates an example of a flow chart illustrating the line width obtaining method according to the first embodiment. As shown in FIG. 2, the line width obtaining method according to the present embodiment includes an optical image data acquiring step (S1), a reference image data generating step (S2), a threshold value determining step (S3), an edge pair detecting step (S4), a line width error (ΔCD) obtaining step (S5), and a ΔCD map generating step (S6). These steps will be described using FIG. 1.

<Optical Image Data Acquiring Step (S1)>

In the optical image data acquiring step (S1) shown in FIG. 2, an optical image of the pattern of the mask Ma is acquired. Then, the optical image is converted to a digital signal, that is, optical image data.

Firstly, the mask Ma is positioned on the table 101. The mask Ma is fixed on the table 101 by use of a vacuum pump, as one example.

When the mask Ma is positioned on the table 101, the pattern formed on the mask Ma is irradiated with the light from the illumination optical system 103. Specifically, the light from the light source 103a irradiates the mask Ma through the magnifying optical system 103b. The light transmitted or reflected by the mask Ma is then focused, and thereby an optical image of the pattern of the mask Ma is acquired.

To accurately perform the measurement of the line width, it is necessary that the pattern of the mask Ma as a measurement target is aligned at the predetermined position on the table 101. For example, an alignment mark can be provided to align the pattern of the mask Ma on the table 101. An optical image of the alignment mark is acquired by the imaging unit 104, and then the pattern of the mask Ma is aligned to the predetermined position using the optical image of the alignment mark. Further, when the mask Ma is placed at the predetermined position on the table 101 provided in an inspection apparatus, a rotation angle (θ) from the predetermined position of the mask Ma, a whole extension of the pattern, or a whole contraction of the pattern due to a temperature fluctuation can be calculated using the alignment mark. For example, XY-coordinate axes of the pattern surface of the mask Ma are aligned parallel and perpendicular to a traveling axis of the table 101 in the inspection apparatus. Thereby a rotational error or an extension and contraction error of the pattern of the mask Ma is normalized with respect to the optical system of the line width error obtaining apparatus 100. For example, X-axes and Y-axes of the two alignment marks of the design data that are provided in the mask Ma to establish a horizontal or vertical position relationship are aligned so as to be parallel or perpendicular to the traveling axis of the table 101, the mask Ma is aligned so as to be located at the predetermined position by rotating a θ-axis of the table 101 based on the alignment mark, and a distance between the two alignment marks is measured. An extension and contraction ratio of the mask Ma is calculated by comparing the measured distance to a theoretical distance between the alignment marks, which is previously provided to the line width error obtaining apparatus 100. Accuracy of a measurement value can be enhanced by reflecting the obtained value on the correction calculation of the measurement value of the position or dimension of the pattern. The measured position and the dimension of the pattern can be amended using the obtained value, and thereby the accuracy of the measurement value can be enhanced.

The alignment mark does not necessarily need to be provided in the mask Ma. In this case, the alignment can be performed using the vertex of the corner, in which the X-coordinate and Y-coordinate are equal, or the side of the edge pattern, which is close to an outer periphery of the mask Ma, in the pattern of the mask Ma. The table 101 includes a XY-table movable along the horizontal direction, and a θ-table movable in the rotational direction on the XY-table. Specifically, in the alignment process, an X-axis and a Y-axis of the pattern to be measured are aligned with the running axis of the XY-table while the mask Ma is positioned on the table 101.

Figure 3:
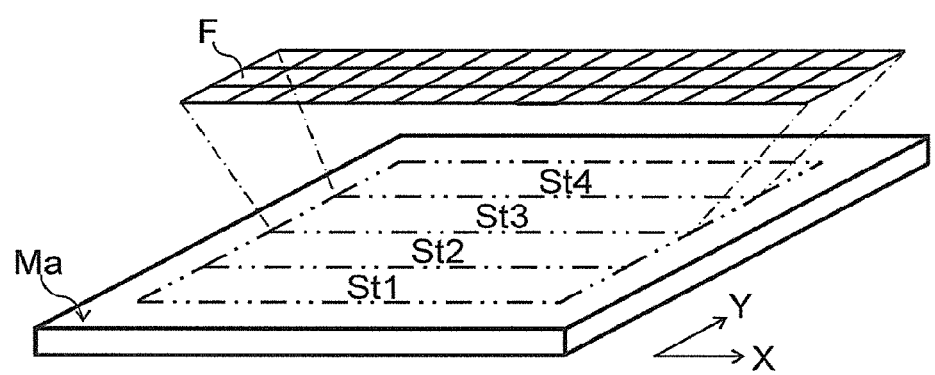
FIG. 3 illustrates a relationship between a region to be inspected, and stripes and frames of a mask.

A region, in which the line width is to be measured in the mask Ma, that is, the region in which a pattern to be measured is formed, is virtually divided into strip-shaped multiple regions (St1, St2, St3, and St4 . . . ) as shown in the schematic diagram of FIG. 3. The strip-shaped multiple region is called a stripe. Each strip-shaped region has, for example, a width of several hundred micrometers and a length of approximately 100 mm that corresponds to a total length in an X-direction or a Y-direction of the region to be inspected.

Further, a plurality of units, each unit represented by "F", in which optical images are acquired (hereinafter each unit is referred to as "frame"), are divided in a grid shape that is virtually set in each stripe. Each frame is preferably a square having each side equal to the width of the stripe, or a square, wherein each side of the square is the width of the stripe divided into approximately four, that is, wherein the perimeter of the square is equal to the width of the stripe.

Next, the optical image of the mask Ma in each stripe is acquired. That is, in acquiring the optical image as shown in FIG. 3, the operation of the table 101 is controlled such that each stripe $St_1$, $St_2$, $St_3$, $St_4$, . . . is continuously scanned. Specifically, the optical image of the stripe $St_1$ is sequentially acquired along X-direction while the table 101 is moved in the −X-direction as shown in FIG. 3. The optical image is continuously input to the photodiode array 104b as shown in FIG. 1. Then, the optical image of the stripe $St_2$ is acquired after the optical image of the stripe $St_1$ is acquired. In this case, after the table 101 moves in the −Y-direction in a stepwise manner, the optical image is acquired while the stage 2 moves in the direction (X-direction) opposite to the direction (−X-direction) in which the optical image of the stripe $St_1$ was acquired, and the optical image of the stripe $St_2$ is continuously input to the photodiode array 104b. When the optical image of the stripe $St_3$ is acquired, after moving the table 101 in the −Y-direction in a stepwise manner, the table 101 moves in the direction opposite to the direction (X-direction) in which the optical image of the stripe $St_2$ was acquired, namely, the direction (−X-direction) in which the optical image of the stripe $St_1$ was acquired. The optical image of the stripe $St_4$ is acquired in the same manner as mentioned above.

In the imaging unit 104, the light transmitted through the mask Ma is imaged as an optical image of the pattern of the mask Ma, and is then subjected to A/D (Analog to Digital) conversion. After that, the optical image data is output from the imaging unit 104 to the line width error obtaining unit 126. Specifically, the photodiode array 104b acquires the optical image of the mask Ma, and sequentially outputs the analog signal corresponding to the optical image to the sensor circuit 104c. The sensor circuit 104c converts each analog signal output from the photodiode array 104b to the digital signal, that is, optical image data, and outputs the optical image data to the line width error obtaining unit 126.

The optical image data is input to a digital amplifier (not illustrated), that is provided in the sensor circuit 104c, and which can adjust an offset and a gain for each pixel. The gain for each pixel of the digital amplifier is predetermined in a calibration process. For example, in the calibration process for transmitted light, a black level is predetermined while the image of a light-shielding region on the mask Ma, sufficiently wider than an area in which the image is acquired by the imaging unit 104, is acquired. Then, a white level is set while the image of a transmitted light region in the mask Ma, sufficiently wider than an area in which the image is acquired by the imaging unit 104, is acquired. At this point, in consideration of a fluctuation in light quantity during the inspection, the offset and the gain are adjusted in each pixel such that amplitudes of the white level and black level are distributed in a range of 10 to 240 corresponding to approximately 4% to approximately 94% of 8-bit gradation data.

<Reference Image Data Generating Step (S2)>

In the reference image data generating step (S2) shown in FIG. 2, the reference image data is generated based on the design pattern data of the mask Ma. The reference image data becomes the reference for determining an existence of a defect by being compared with the optical image data in the inspection process according to die-to-database comparison method.

Figure 4:
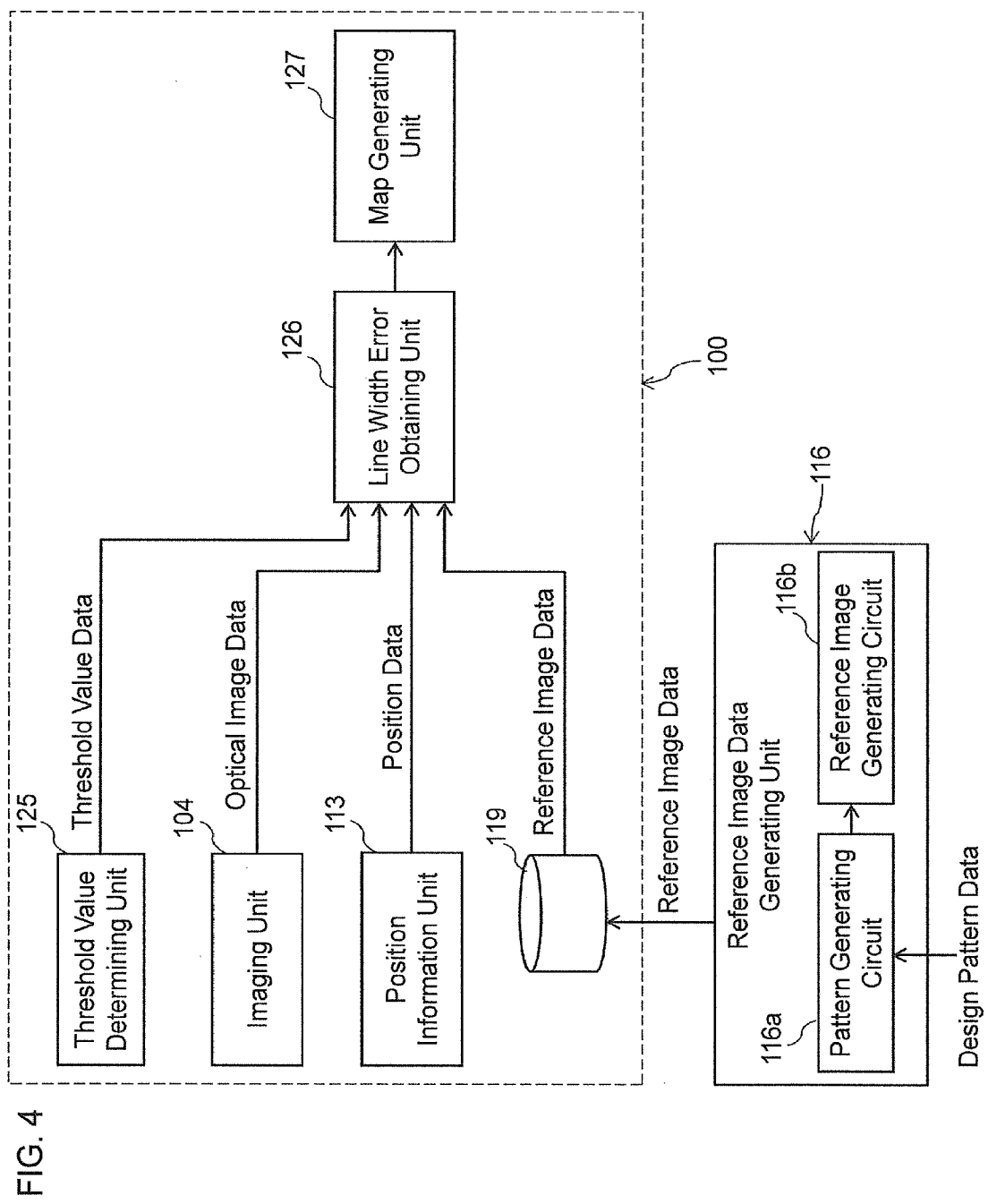
FIG. 4 illustrates a data flow in the line width error obtaining apparatus shown in FIG. 1.

FIG. 4 schematically illustrates the reference image data generating step (S2). The reference image data generating unit 116 shown in FIG. 4 is an external apparatus of the line width error obtaining apparatus 100. The reference image data generating unit 116 includes a pattern generating circuit 116a and a reference image generating circuit 116b. When the design pattern data is input to the pattern generating circuit 116a, the pattern generating circuit 116a converts the design pattern data into binary or multi-value image data. The reference image generating circuit 116b then performs the proper filtering to the image data. The reason for performing the filtering is as follows.

In the production process, because roundness of a corner and a finished dimension of the line width of the pattern of the mask Ma is generally adjusted, the pattern of the mask Ma is not strictly matched with the design pattern. Further, the optical image data acquired in the imaging unit 104 shown in FIG. 1 is faint due to a resolution characteristic of the magnifying optical system 103b or an aperture effect of the photodiode array 104b, in other words, the functioning state of a spatial lowpass filter.

Accordingly, a function for generating a reference image, hereinafter referred to as a "reference image generating function", is determined by simulating the fluctuation caused by the production process of the mask Ma and the optical system of the line width error obtaining apparatus 100 based on the design pattern data and the optical image data of the mask Ma. The design pattern data is subjected to a two-dimensional digital filter using the reference image generating function. In the example shown in FIG. 4, the reference image generating circuit 116b performs two-dimensional digital filtering to the image data from the pattern generating circuit 116a, using the reference image generating function, to generate the reference image data.

The reference image data generated in the reference image data generating unit 116 is input to the magnetic disk device 119 of the line width error obtaining apparatus 100.

Figure 5:
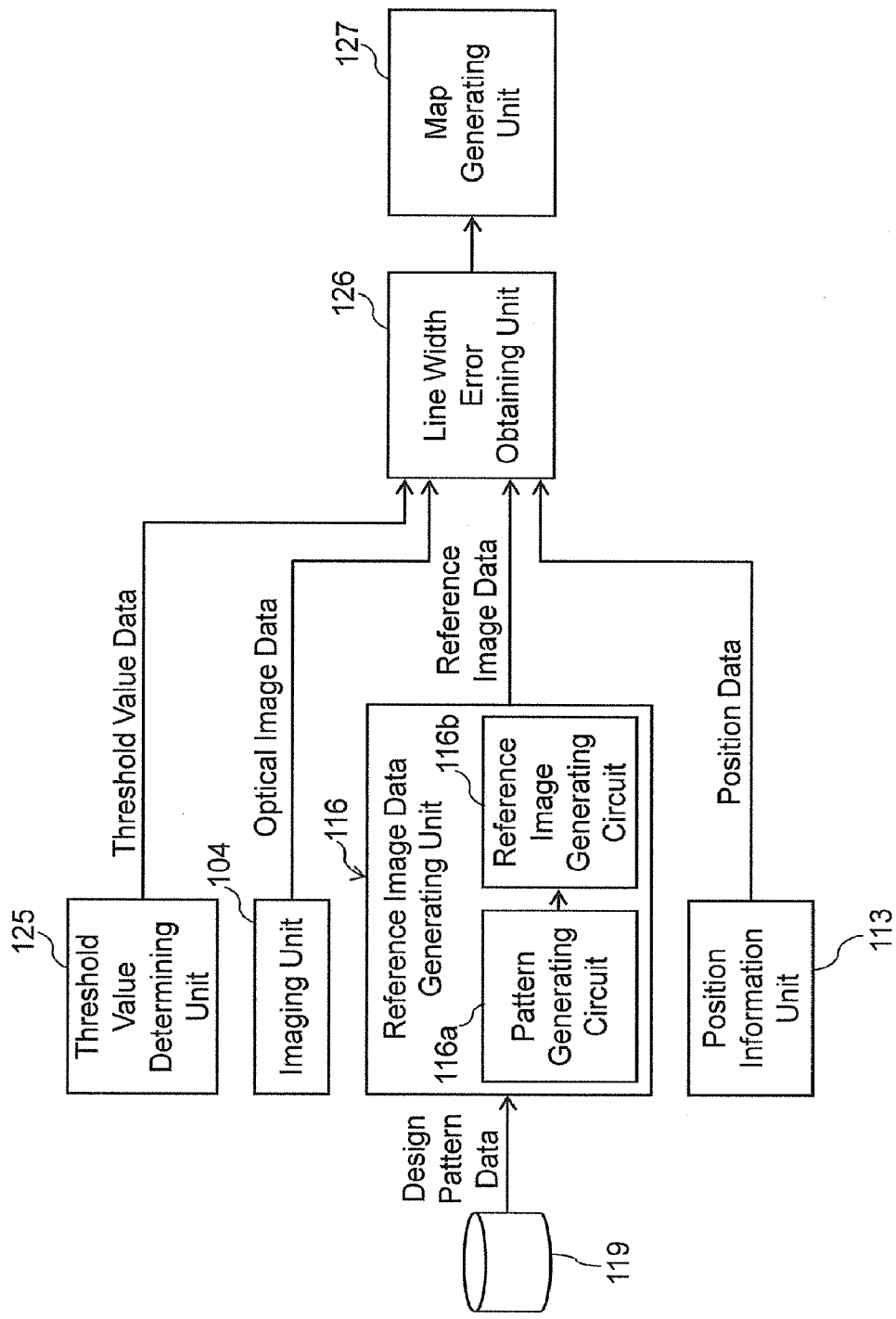
FIG. 5 illustrates another example of a data flow in the line width error obtaining apparatus according to the first embodiment.

In the present embodiment, as shown in FIG. 5, the line width error obtaining apparatus 100 may include the reference image data generating unit 116. In this case, the design pattern of the mask Ma may be stored to the magnetic disk device 119 of the line width error obtaining apparatus 100, for example. The design pattern data is read from the magnetic disk device 119 and transmitted to the reference image data generating unit 116. The method for generating the reference image data in the reference image data generating unit 116 is the same as the previous description as shown in FIG. 4.

<Threshold Value Determining Step (S3)>

When the line width (CD) of the pattern formed in the mask Ma is measured, it is necessary for the position of the edge of the pattern as a reference position of the measurement to be determined. In the present embodiment, the position of the edge is determined by a conventionally known threshold method. For example, an arbitrary value (threshold value) is specified between the signal amount (luminance) of the black level and the signal amount (luminance) of the white level of the reference image data. The threshold value is a value internally divided between the minimum value and the maximum value of the signal amount by a prescribed division ratio. In other words, the threshold value is a value that separates consecutive values between the minimum value and the maximum value into two groups. That is, consecutive values between the minimum value and the maximum value are split into two groups by the division ratio taking the threshold value as a boundary. Then, the position of the edge is set at a position corresponding to the signal amount of the threshold value in the reference image data. Further, the position of the edge is set at a position of the signal amount that matches this threshold value in the optical image data. The threshold value is determined in the threshold value determining step (S3) shown in FIG. 2. For example, in the case of a line and space pattern, a threshold value corresponds to the boundary between the line pattern and the space pattern.

Figure 6:
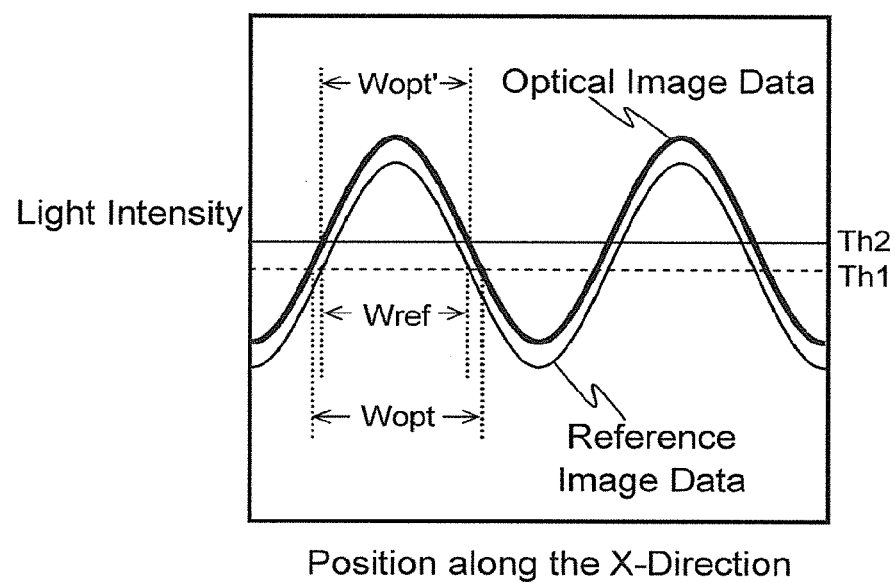
FIG. 6 illustrates an example of the intensity of light incident on a photodiode array shown in FIG. 1.

FIG. 6 illustrates an example of the intensity of light incident on the photodiode array 104b shown in FIG. 1. In FIG. 6, the horizontal axis illustrates a position along the X-direction on the photodiode array 104b, and the vertical axis illustrates the intensity of light. Further, in FIG. 6 the thin line curve illustrates reference image data. As reference image data is a reference of optical image data, the optical image data should have the same curve as the reference image data. However, when the light quantity of the light source 103a shown in FIG. 1 is increased, the signal amount of the optical image data will have the same the curve illustrated by the thick line in FIG. 6, for example.

The threshold value Th1 that determines the position of the pattern, is determined from the reference image data, illustrated by the thin line in FIG. 6, using the formula (1).

$$\text{Th1}=\{(\text{Maximum Value of Signal Amount})-(\text{Minimum Value of Signal Amount})\}/2 \qquad (1)$$

When the threshold value Th1 is determined, the position of the edge of the pattern is determined. Accordingly, the line width Wref of the pattern is obtained. The line width Wref corresponds to the design value of the line width of the pattern. The line width error ($\Delta$CD) is obtained by calculating the difference between the line width Wref and the line width of the optical image data corresponding to the actual pattern. In the optical image data, the position of the signal amount (intensity) equal to the threshold value Th1 represents the edge of the pattern.

In the case where the pattern is formed in the mask Ma as designed, that is, exactly as specified, the optical image data of the pattern should match with the reference image data of the pattern. Therefore, the line width of the optical image data should be equal to the line width Wref. However, in the case where the light quantity of the light source 103a shown in FIG. 1 is increased, the signal amount of the optical image data will have the same curve as illustrated by the thick line in FIG. 6. Accordingly, when the position of the edge of the pattern is determined using the threshold value Th1 in the optical image data, the line width Wopt is obtained, and the line width error ($\Delta$CD: Wopt-Wref) occurs between the line width Wopt and the line width Wref. That is, though the line width of the pattern obtained from the optical image data should be identical to Wref, and the line width error ($\Delta$CD) should be zero, the line width error (Wopt-Wref) occurs. Thereby an erroneous value of the line width error is measured.

In the present embodiment, the threshold value is changed according to the change of the light quantity of the light source. In the case of the example shown in FIG. 6, a new threshold value is determined from the optical image data illustrated by the thick line using the formula (2). Then, the position corresponding to the signal amount (intensity) equal to the threshold value Th2 represents the edge of the pattern.

$$\text{Th2}=\{(\text{Maximum Value of Signal Amount})-(\text{Minimum Value of Signal Amount})\}/2 \qquad (2)$$

Further, the new threshold value can be obtained by a different method to the method using the formula (2). For example, the new threshold value might be specified by performing an experiment for measuring line widths while a threshold value is changed, thereby obtaining a threshold value so that line widths of a pattern in the optical image data match with Wref.

Next, a new position of the edge of the pattern is obtained using the threshold value Th2 in the optical image data, thereby a new line width Wopt' is obtained. The line width can be accurately obtained by calculating a difference between the line width Wopt' and the line width Wref obtained from the reference image data.

In the line width error obtaining apparatus 100, the master control unit 110 reads the reference image data input into the magnetic disk device 119, and transmits the reference image data to the threshold value determining unit 125, as one example. The threshold value determining unit 125 determines the threshold value from the reference image data using the formula (1), as one example. When the light quantity of the light source 103a fluctuates while the optical images of the pattern to be measured are acquired, the fluctuation is detected through the light quantity sensor 140. Specifically, the light quantity data of the light source 103a that is detected by the light quantity sensor 140 is transmitted to the threshold value determining unit 125. The threshold value determining unit 125 specifies a new threshold value using the relationship between the fluctuations of the light quantity and the threshold values stored in the magnetic disk device 119. On the other hand, if the light quantity does not fluctuate, it is not necessary to set a new threshold value, and the latest threshold value can be maintained.

The relationship between the fluctuations of the light quantity and the threshold values can be predetermined by performing an experiment. For example, in regards to the optical image data varied by the fluctuation of the light quantity of the light source in the same manner as the relationship between the light quantity and the optimum threshold value Th2 when the optical image data is acquired as shown in FIG. 6, an optimum threshold value is obtained by performing an experiment on every fluctuation of the light quantity and is stored into the magnetic disk device 119.

Figure 7:
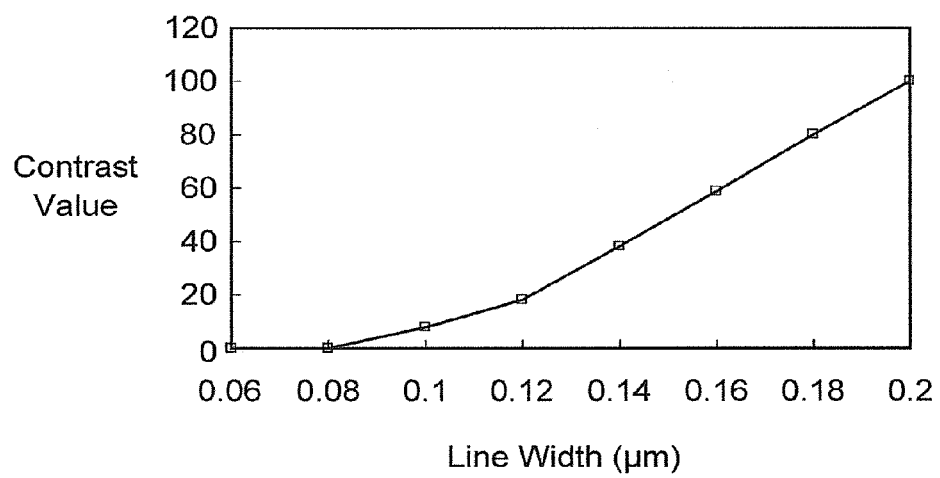
FIG. 7 illustrates a relationship between design values of line widths of a pattern and contrast values regarding an optical image.

FIG. 7 illustrates a relationship between a design value of a line width of a pattern and a difference of luminance between the brightest position and the darkest position, namely, a contrast value, as one example. As shown in FIG. 7, the contrast value is decreased with a decrease in the line width. Specifically, the white level is increased in the optical image. This will be described using the example illustrated in FIG. 8.

Figure 8:
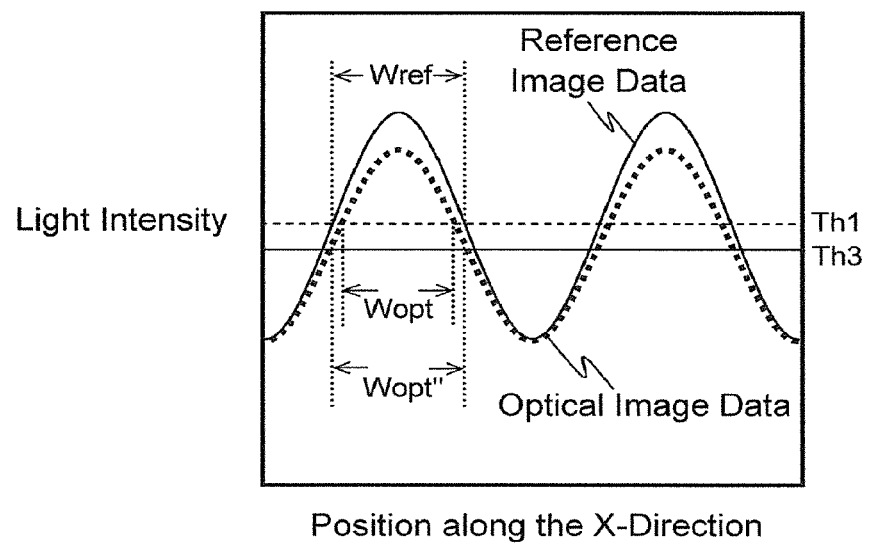
FIG. 8 illustrates another example of the intensity of light incident on a photodiode array shown in FIG. 1.

FIG. 8 illustrates another example of the intensity of light incident on a photodiode array 104b shown in FIG. 1. The thin line curve in FIG. 8 illustrates the reference image data. As mentioned above, reference image data is generated from design data of the pattern in the optical image data. Accordingly, the optical image data should have the same curve as the reference image data. However, when the line width of the pattern is decreased, the contrast value is also decreased, as shown in FIG. 7. That is, although the contrast value of the pattern should be constant in spite of the line width, the contrast value is decreased due to the fineness of the line width. The decrease of line width is mainly caused by the decrease of the white level. Accordingly, when the pattern to be measured is fine as in FIG. 8, the white level of the optical image data becomes lower than white level of the reference image data. Thereby, the signal amount will become the dotted line curve as shown in FIG. 8.

As mentioned above, the threshold value Th1 that sets the position of the edge of the pattern, is determined by the formula (1) from the thin line of the reference image data shown in FIG. 8, for example.

$$Th1=\{(\text{Maximum Value of Signal Amount})-(\text{Minimum Value of Signal Amount})\}/2 \quad (1)$$

As the threshold value Th1 is determined, the position of the edge of the pattern is set, then, the line width Wref of the pattern is measured. The line width Wref corresponds to the design value of the line width of the pattern. Therefore, if the pattern to be measured is the same as the design pattern, the optical image data should match the reference image data. As a result, the line width of the optical image data should be equal to the line width Wref. However, contrast values are decreased in a fine pattern, thereby signal amounts of optical image data are illustrated by the dotted line curve as shown in FIG. 8. Therefore, when positions of edges in the optical image data are set using the threshold value Th1, the line width Wopt is obtained. As a result, the line width error (ΔCD: Wopt-Wref) occurs between the line width Wopt and the line width Wref. That is, although the line width that can be obtained from the optical image data should be same as the line width Wref, and therefore the line width error (ΔCD) should be zero, the line width error (Wopt-Wref) occurs, and the erroneous error of the line width is measured.

In this case, the threshold value is changed according to the decrease of the contrast value. In the example shown in FIG. 8, a new threshold value Th3 is determined using the formula (3) from the optical image data illustrated by the dotted line. Then, the position of the signal amount that matches to the threshold value Th3 is set to the edge of the pattern.

$$Th3=\{(\text{Maximum Value of Signal Amount})-(\text{Minimum Value of Signal Amount})\}/2 \quad (3)$$

Further, the new threshold value can be obtained by a different method to the method using the formula (3). For example, the new threshold value might be specified by performing an experiment for measuring line widths while a threshold value is changed, thereby obtaining a threshold value so that line widths of a pattern in the optical image data match with Wref.

Next, a new position of the edge of the pattern is obtained using the threshold value Th3 in the optical image data, thereby a new line width Wopt" is obtained. The line width can be accurately obtained by calculating a difference between the line width Wopt" and the line width Wref obtained from the reference image data.

In the line width error obtaining apparatus 100 shown in FIG. 1, for example, the graph for illustrating the relationship of the signal amounts between the optical image data and the reference image data as shown in FIG. 8, is created in the threshold value determining unit 125. The graph of the optical image data as shown in FIG. 7, that is, the graph for illustrating the relationship between the design data of the line widths and contrast values of the pattern, is stored in the magnetic disk device 119. Further, the relationship between the contrast values and the threshold values that is predetermined by performing an experiment is stored in the magnetic disk device 119. For example, with regards to the optical image data of which the contrast value is decreased due to the fineness of the line width, in the same manner as the contrast value of the optical image data and the optimum threshold value Th3 of the optical image data as shown in FIG. 8, optimum threshold values are obtained for each contrast value by performing an experiment, and are then stored in the magnetic disk device 119. The threshold value determining unit 125 refers to the above-mentioned graph read by the master control unit 110 from the magnetic disk device 119 when the white level of the optical image data is decreased. Then, if the threshold value determining unit 125 determines that the decrease of the contrast value is caused by the fineness of the pattern, the threshold value determining unit 125 reads the relationship between the contrast value and the threshold value from the magnetic disk device 119 and specifies a new threshold value corresponding to the decreased contrast value using the relationship. On the other hand, if the contrast value does not decrease, it is not necessary to set a new threshold value, and the latest threshold value is maintained.

<Edge Pair Detecting Step (S4)>

In the edge pair detecting step (S4) shown in FIG. 2, an edge pair that is used for the measurement of the line width (CD) is detected from the optical image data obtained in the optical image data acquiring step (S1) and the reference image data obtained in the reference image data generating step (S2). Specifically, a position of the edge of the pattern is determined, using the latest threshold value obtained in the threshold value determining step (S3), in the optical image data. Then, a position of the edge of the optical image data that is paired with the position of the edge of the pattern in the reference image data is detected. The edge pair consists of one edge that becomes a starting point for the measurement of a line width, and another edge that becomes an ending point of the measurement of the line width among the detected edges. As one example, the edge pair is detected in a unit of a pixel, that is, within one pixel. For example, in the case where the pattern is a line pattern consisting of two edges extending along the Y-axis, an edge pair is detected in a unit of a pixel on both edges. Further, in the case where the pattern is a line pattern consisting of two edges extending along the X-axis, an edge pair is also detected in a unit of a pixel on both edges.

The edge pair detecting step (S4) is performed in the line width error obtaining unit 126 shown in FIG. 1. The measurement value of the position coordinate of the table 101 is measured by the laser length measuring system 102 and is transmitted from the position information unit 113 to the line width error obtaining unit 126, thereby a position coordinate of each edge is obtained. Specifically, this process will be described as follows. Firstly, optical image data acquired in a unit of a stripe is divided into data of a predetermined size, for example, data of a unit of a frame. Next, a predetermined region of optical image data is compared with reference image data corresponding to the predetermined region, and then the table 101 is moved in parallel to a position at which an absolute value of a difference between the optical image data and the reference image data becomes the minimum, or a position at which the sum of squares of the difference between the optical image data and the reference image data becomes the minimum, using a pattern matching method. A position coordinate of the pattern to be measured is determined from the amount of the parallel movement and from the data of the laser length measuring system 102 corresponding to the frame. Thereby the position coordinate of the edge can be obtained.

<Line Width Error (ΔCD) Obtaining Step (S5)>

In the line width error obtaining unit 126 shown in FIG. 1, the line width error obtaining step is performed after the edge pair detecting step (S4).

As one example of a pattern to be measured, the pattern is a line and space pattern of which each line pattern consisting of two edges extending along the Y-direction that are arranged along the X-direction at predetermined intervals so that a plurality of space patterns are formed. A line width error regarding the line width of the line pattern, and a line width error regarding the line width of the space pattern are individually measured. Specifically, the line widths of each line pattern and the line widths of each space pattern are measured using the edge pairs detected in the edge pair detecting step (S4).

Figure 9:
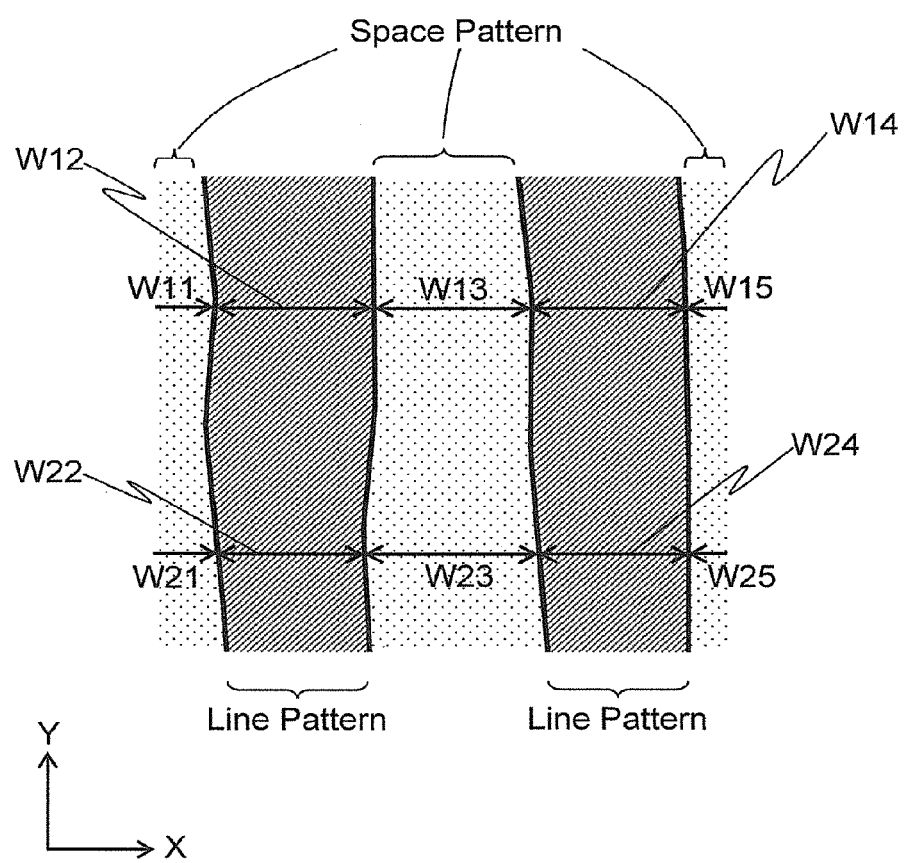
FIG. 9 is a plan view of a part of a line and space pattern as an example of a pattern to be inspected.

FIG. 9 is a plan view of a part of a line and space pattern as an example of a pattern to be measured. In FIG. 9, the section indicated by the hatched lines corresponds to the line pattern, the section provided between two line patterns corresponds to the space pattern. For example, the line widths W12, and W14, etc., are measured along the X-direction at the same position of the Y-direction in regards to each line pattern. In the same manner, the line widths W11, W13, and W15, etc., are measured along the X-direction in regards to each space pattern. Then, at the next position, shifted by one pixel in the −Y-direction, the line widths W22, and W24, etc., are measured along the X-direction at the same position of the Y-direction in regards to each line pattern. In the same manner, the line widths W21, W23, and W25, etc., are measured along the X-direction in regards to each space pattern.

Figure 10:
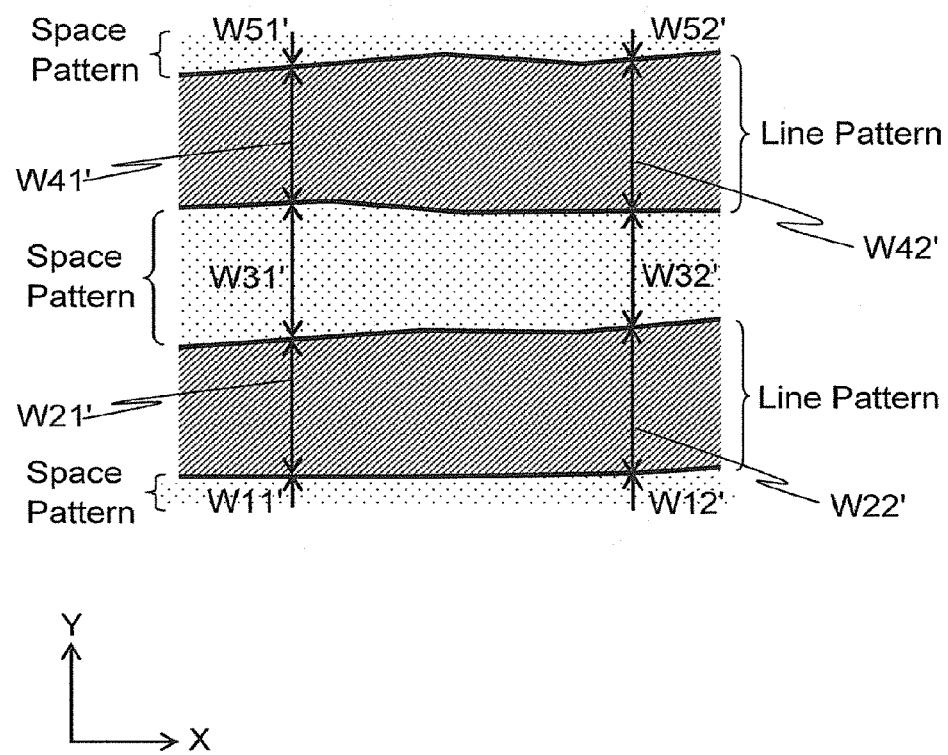
FIG. 10 is a plan view of a part of a line and space pattern as another example of a pattern to be inspected.

FIG. 10 is also a plan view of a part of a line and space pattern. In FIG. 10, the section indicated with the hatched lines corresponds to the line pattern and the section provided between two line patterns corresponds to the space pattern in the same manner as FIG. 9. As shown in FIG. 10, the pattern is a line and space pattern of which each line pattern consisting of two edges extending along the X-direction, are arranged along the Y-direction at predetermined intervals so that a plurality of space patterns are formed. In this case, a line width error regarding the line width of the line pattern, and a line width error regarding the line width of the space pattern are also measured individually. That is, the line widths of each line pattern and the line widths of each space pattern are measured using the edge pairs detected in the edge pair detecting step (S4).

Specifically, the line widths W21', and W41', etc., are measured along the Y-direction at the same position of the X-direction in regards to each line pattern. In the same manner, the line widths W11', W31', and W51', etc are measured along the Y-direction in regards to each space pattern. Then, at the next position shifted by one pixel in the X-direction, the line widths W22', and W42', etc are measured along the Y-direction at the same position of the X-direction in regards to each line pattern. In the same manner, the line widths W12', W32', and W52', etc are measured along the Y-direction in regards to each space pattern.

These line widths (first line widths) measured by the above-mentioned method in regards to each pattern of the optical image data are compared to line widths (second line widths) obtained using edge pairs of the reference image data corresponding to edge pairs of the optical image data to obtain the difference. The obtained difference is a line width error. The line width error is obtained in each frame, for example. In the example shown in FIG. 9, and the example shown in FIG. 10, the line width errors along the X-direction, and the line width errors along the Y-direction are obtained, using the measurement values, in each frame in regards to the line pattern. In the same manner, the line width errors along the X-direction, and the line width errors along the Y-direction are obtained, using the measurement values, in each frame in regards to the space pattern.

<ΔCD Map Generating Step (S6)>

The ΔCD map generating step (S6) shown in FIG. 2, is performed in the map generating unit 127 shown in FIG. 1. Specifically, the value of the line width error (ΔCD) and the measurement value of the position coordinate of the table 101 (transmitted from the position information unit 113) are transmitted from the line width error obtaining unit 126 to the map generating unit 127. The map generating unit 127 generates a ΔCD map by associating the line width error (ΔCD) with the position coordinate in the mask Ma.

For example, a whole pattern to be measured is divided into a plurality of unit regions consisting of a predetermined region, and a plurality of regions surrounding the predetermined region, of which each surrounding region has the same size as the predetermined region. Then, the minimum value of an absolute value of a difference (ΔCD) between the line width of the predetermined region of the optical image of the pattern to be measured and the line width of the region of the reference image corresponding to the predetermined region becomes the minimum, or a position at which the sum of squares of the difference (ΔCD) between the line width of the predetermined region of the optical image of the pattern to be measured and the line width of the region of the reference image corresponding to the predetermined region becomes the minimum, is obtained in every unit region. Further, in regards to regions arranged near the predetermined region, for example, the region surrounding the predetermined region, of which each region has the same size as the predetermined region, an absolute value of a difference (ΔCD) between the line width of the predetermined region of the optical image of the pattern to be measured and the line width of the region of the reference image corresponding to the predetermined region becomes the minimum, or a position at which the sum of squares of the difference (ΔCD) between the line width of the predetermined region of the optical image of the pattern to be measured and the line width of the region of the reference image corresponding to the predetermined region becomes the minimum, is obtained in every region. Then, an average value of the minimum values of those regions, that is, the predetermined region and a plurality of regions arranged near the predetermined region, is obtained, and the average value becomes an average of ΔCD in every region. A map is generated by correlating the average of ΔCD and the position coordinate in the mask Ma. The unit region can be a frame, as one example.

According to the present embodiment, in the case where optical image data is acquired when a light quantity of a light source fluctuates, or a pattern becomes finer, a line width of the pattern to be measured can be accurately measured by changing a threshold value for setting edges that become a starting point and an ending point for the measurement of the line width, depending on the acquired optical image data. Thereby, a line width error can be accurately obtained, and further a ΔCD map can be accurately obtained.

Further, in the present embodiment, a light quantity of the light source is monitored while optical image data is acquired, and a new threshold value is immediately set when the light quantity fluctuates. Therefore, the new threshold value that matches the optical image data changed due to the fluctuation of the light quantity is determined with the acquisition of the optical image data. That is, a line width error can be accurately obtained in real time while the optical image of the pattern is acquired.

Second Embodiment

In the first embodiment, in regards to a pattern to be measured formed in a mask which is a sample, a line width error is obtained by measuring a line width with while optical image data is acquired. In this case, line width errors are obtained in regards to all patterns, for example. On the other hand, in some cases, a specific pattern is extracted from patterns formed in the mask, and then a line width of only this specific pattern is required. In this case, for example, an arbitrary desired range of a line width is specified and registered. Next, a pattern having a line width that matches a value included in the registered range is extracted, and then the line width error of the extracted pattern is obtained.

Figure 11:
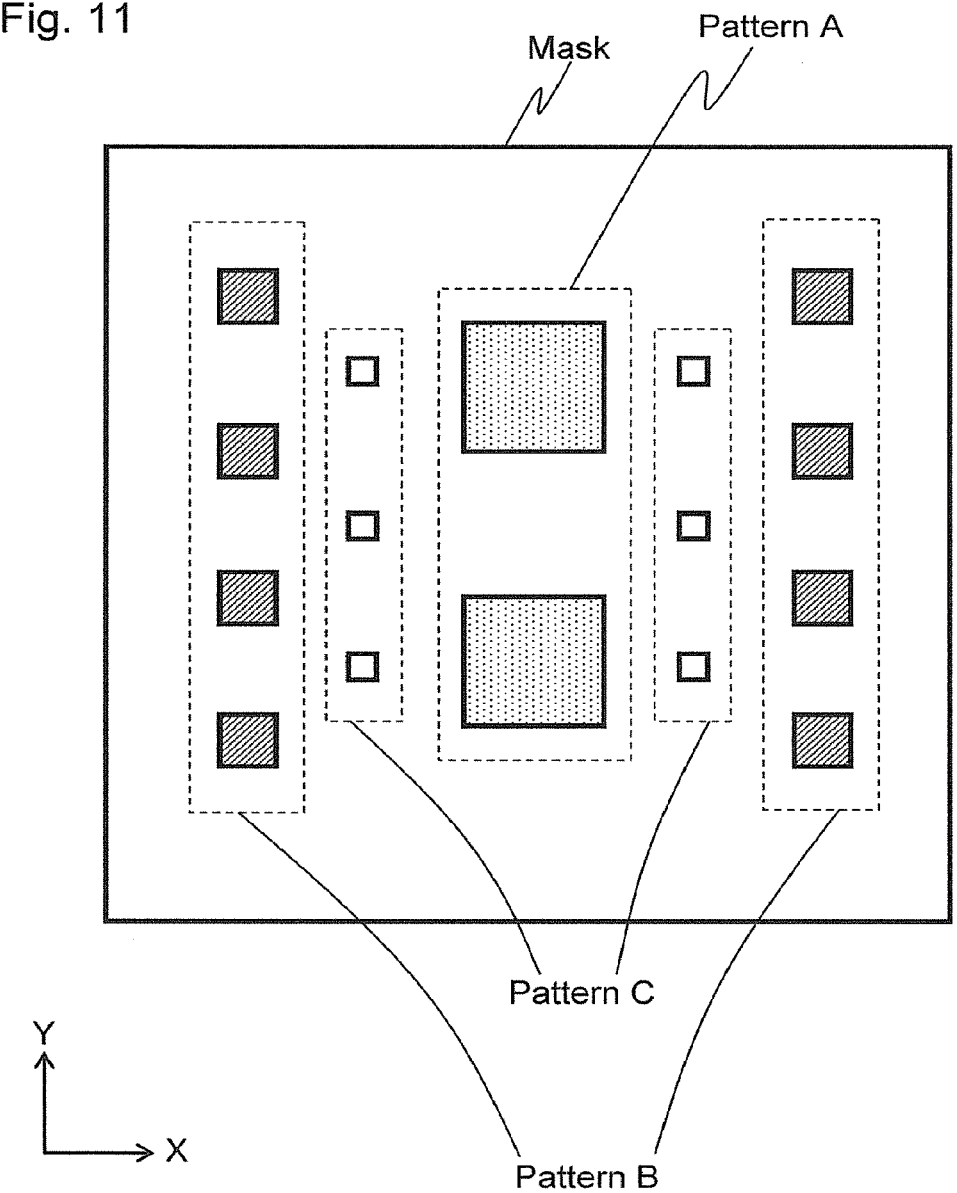
FIG. 11 is a plan view of a part of a pattern formed in a mask.

FIG. 11 is a plan view of a part of the pattern formed in the mask. The design line width of the pattern A is 200 nm in the X-direction. The design line width of the pattern B is 80 nm in the X-direction. The design line width of the pattern C is 40 nm in the X-direction. Further, the actual line width of the pattern A formed in the mask is within the range of ±1 nm from the design line width. The actual line width of the pattern B formed in the mask is within the range of ±1 nm from the design line width. The actual line width of the pattern C formed in the mask is within the range of ±1 nm from the design line width. When the registered line width in the X-direction is within the range of 80 nm±3 nm, the pattern for obtaining the line width error is only the pattern B. Since both the pattern A and the pattern C are not included in the range of the registered line width, these patterns cannot be used for obtaining the line width error.

As mentioned above, referring to FIG. 6 in the first embodiment, when a light quantity of a light source fluctuates in the step for acquiring an optical image of a pattern to be measured, a line width measurement of the pattern to be measured also fluctuates.

For example, when the signal amount of the optical image data becomes the thick line curve of FIG. 6 as mentioned in the first embodiment, by increasing the light quantity of the light source, the line width obtained from the optical image data becomes wider. As a result, for each pattern shown in FIG. 11, the line width of the X-direction has changed, for example, as shown in Table 1.

TABLE 1

| Pattern | Pattern line width before light quantity increase | Pattern line width after light quantity increase |
|---|---|---|
| A | 200 nm ± 0.1 nm | 205 nm ± 0.1 nm |
| B | 80 nm ± 0.1 nm | 85 nm ± 0.1 nm |
| C | 40 nm ± 0.1 nm | 45 nm ± 0.1 nm |

The pattern for obtaining the line width error is a pattern having a line width of 80 nm±3 nm, that is, 77 nm and more than 77 nm, 83 nm and less that 83 nm. As mentioned above, originally, the pattern B should be the subject, but as the line width is 85 nm±0.1 nm, pattern B will not be used as the subject for obtaining line width error. Further, as described with reference to FIGS. 7 and 8 in the first embodiment, a decrease in contrast occurs when the pattern becomes finer. In this case, the problem similar to the above-mentioned occurs, that is, the line width obtained from the optical image data differs from the line width before the light quantity is changed.

Therefore, in the present embodiment, the threshold value for determining the edge position of the pattern in the optical image data is not changed, and the range of the line width for extracting a pattern to be the pattern for obtaining the line width error is changed. In the above-mentioned example, the range of line width is changed from 80 nm±3 nm to 85 nm±3 nm according to the fluctuation of the light quantity of the light source. The range is changed based on the fluctuation data, that is, data of the range of the line width according to the fluctuation in the amount of light quantity, determined by a previously performed experiment. Thereby, the pattern B can be the subject for obtaining the line width error.

Figure 12:
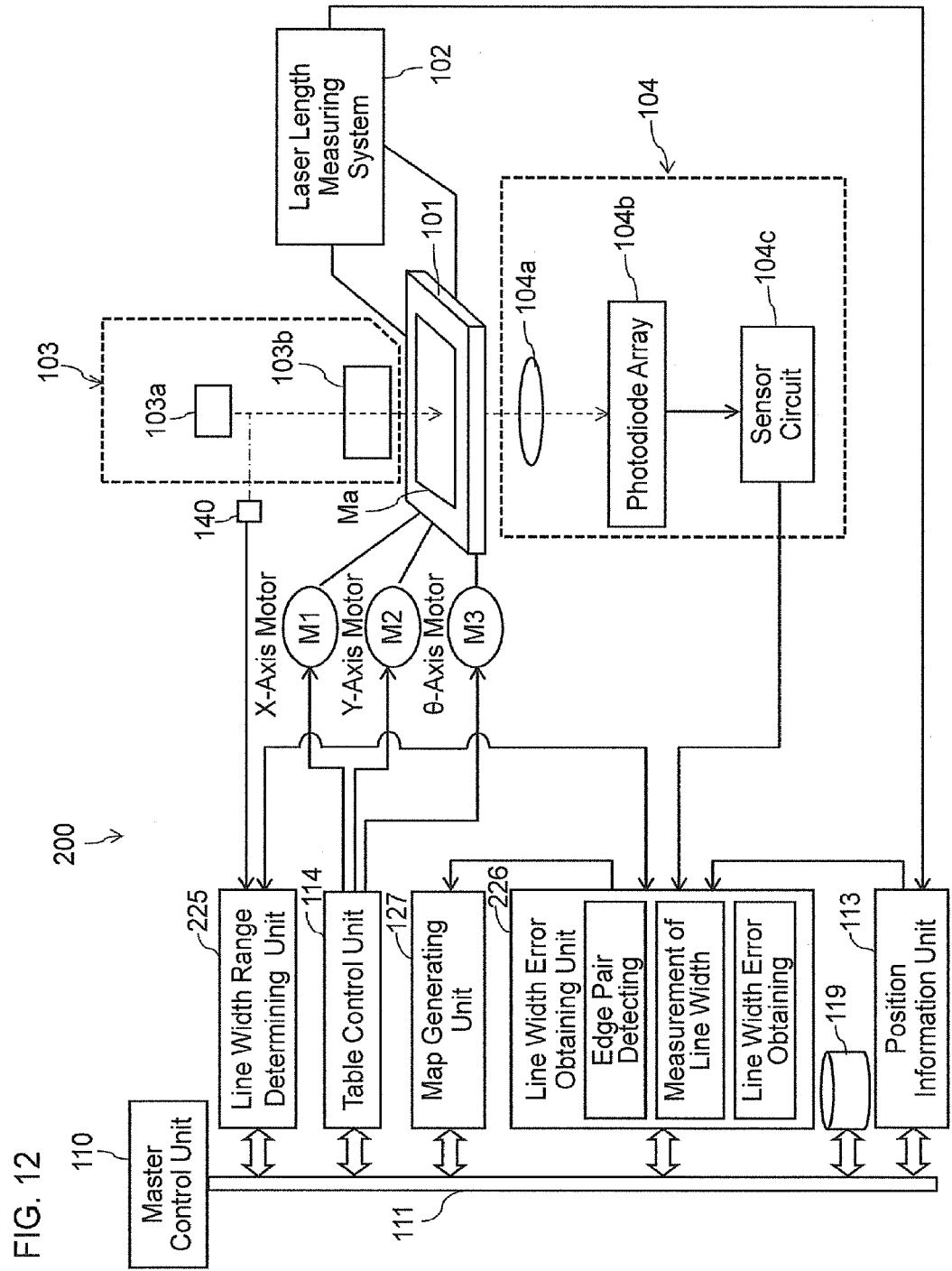
FIG. 12 is a schematic configuration diagram of a line width error obtaining apparatus according to the second embodiment.

FIG. 12 is a schematic configuration diagram of a line width error obtaining apparatus 200 of the present embodiment. In FIG. 12, portions denoting the reference numerals are the same as in FIG. 1, and a repeated explanation is therefore omitted.

Figure 13:
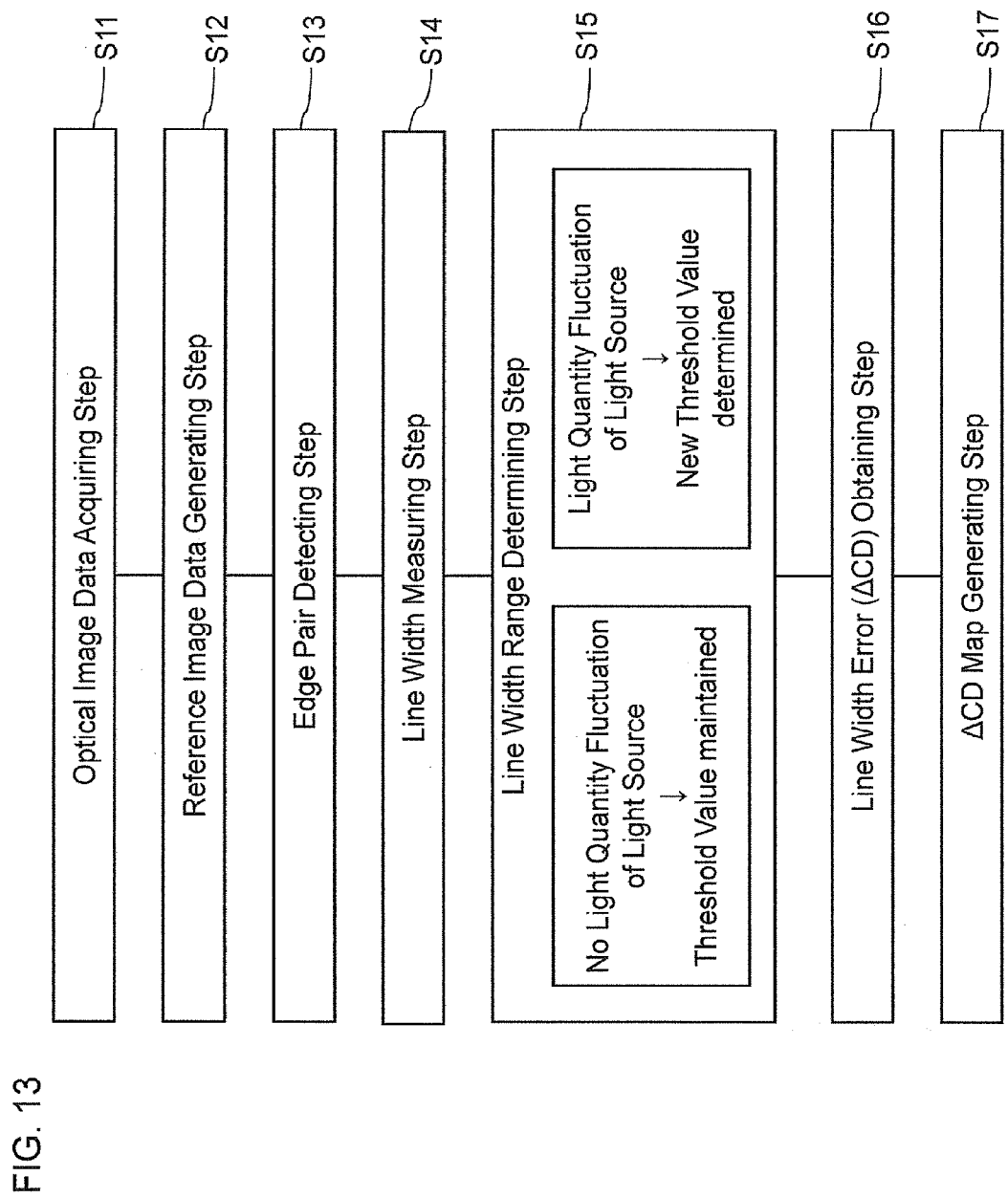
FIG. 13 illustrates an example of a flow chart illustrating a line width obtaining method according to the second embodiment.

FIG. 13 is one example of a flowchart illustrating the line width error obtaining method according to the present embodiment. The line width error obtaining method according to the present embodiment can be performed using the line width error obtaining unit 200 shown in FIG. 12.

In FIG. 13, the optical image data acquiring step (S11), and the reference image data generating step (S12), are the same as the optical image data acquiring step (S1) and the reference image data generating step (S2) of FIG. 2 mentioned in the first embodiment, and a repeated explanation is therefore omitted.

<Edge Pair Detecting Step (S13)>

In the edge pair detecting step (S13) as shown in FIG. 13, the edge pair to be the standard of the measurement of the line width (CD) is detected using optical image data obtained in the optical image data acquiring step (S11), and reference image data generated in the reference image data generating step (S12).

Specifically, the position of the edge of the pattern is determined using the threshold value. The threshold value is obtained from the reference image data. In the present embodiment, the position of the edge is determined by a conventionally known threshold method. For example, an arbitrary value (threshold value) is specified between the signal amount (luminance) of the black level and the signal amount (luminance) of the white level of the reference image data. The threshold value is a value internally divided between the minimum value and the maximum value of the signal amount by a prescribed division ratio. In other words, the threshold value is a value that separates consecutive values between the minimum value and the maximum value into two groups. That is, consecutive values between the minimum value and the maximum value are split into two groups by the division ratio taking the threshold value as a boundary. Then, the position of the edge is set at a position corresponding to the signal amount of the threshold value in the reference image data. Further, the position of the edge is set at a position of the signal amount that matches this threshold value in the optical image data. For example, the threshold value Th1 is determined by the formula (1) from the reference image data illustrated by the thin line as shown in FIG. 6 of the first embodiment. The determined threshold value is stored in the magnetic disk device 119, as one example.

$$Th1=\{(\text{Maximum Value of Signal Amount})-(\text{Minimum Value of Signal Amount})\}/2 \quad (1)$$

Next, the position of the edge of the optical image data, which becomes a pair with the position of the edge of the reference image data, is detected. In the optical image data, the position corresponding to the signal amount (intensity), which is equal to the threshold value Th1, becomes the edge of the pattern.

The edge pair consists of an edge, which is a starting point for the measurement of the line width, and another edge, which is the ending point for the measurement of the same line width, for each edge detected. The edge pair is detected in a unit of a pixel, for example. For example, in the case of the line pattern of which two edges extend along the Y-direction, an edge pair is detected on both edges in a unit of a pixel. In the case of a line pattern in which two edges extend along the X-direction, an edge pair is detected on both edges of a unit of a pixel.

The edge pair detecting step (S13) is performed in the line width error obtaining unit 226 shown in FIG. 12. The line width error obtaining unit 226 detects an edge pair from the optical image data output from the sensor circuit 104c, and the reference image data and the threshold value read by the master control unit 110 from the magnetic disk device 119 as mentioned above. Further, the measurement value of the position coordinate of the table 101 measured by the laser length measuring system 102 is transmitted from the position information unit 113 to the line width error obtaining unit 226, thereby the position coordinate of each edge is obtained.

<Line Width Measuring Step (S14)>

In the line width error obtaining unit 226 in FIG. 12, the line width measuring step (S14) is performed after the edge pair detecting step (S13). The line width measuring step (S14) can be explained using FIGS. 9 and 10 in the same manner as the first embodiment and therefore a repeated description is omitted.

<Line Width Range Determining Step (S15)>

In the present embodiment, the line width is obtained by extracting only a pattern having a specific line width among each the line widths of each pattern measured, as mentioned above. In order to obtain the line width error the desired range of the line width is specified and registered in the line width range determining step (S15). The line width range determining step (S15) is performed in the line width range determining unit 225 in FIG. 12.

When the light quantity of the light source 103a is fluctuated while the optical images of the pattern of the mask Ma (measurement pattern) are acquired, the fluctuation is detected by the light quantity sensor 140. Specifically, the light quantity data of the light source 103a, that is detected by the light quantity sensor 140, is transmitted to the line width range determining unit 225. The line width range determining unit 225 specifies a new line width range using the relationship between the fluctuations of the light quantity and the line width range stored in the magnetic disk device 119. On the other hand, if the light quantity does not fluctuate, it is not necessary to set a new line width range, and the latest line width range can be maintained.

The relationship between the fluctuations of the light quantity and the threshold values can be predetermined by performing an experiment. For example, an optimum line width range is obtained by performing an experiment on every fluctuation amount of the light quantity and the result is then stored in the magnetic disk device 119, in regards to the optical image data varied by the fluctuation of the light quantity of the light source, in the same manner as the relationship between the light quantity and the optimum line width range (85 nm±3 nm) when the optical image data is acquired after the fluctuation of the light quantity as shown in table 1.

As described with reference to FIGS. 7 and 8 in the first embodiment, in the case where the line width of the optical data becomes different to the line width based on the fluctuation of the light quantity due to the deviation of the contrast value caused by the refinement of the pattern, the extraction of the pattern is correctly performed by setting a new line width range in the line width range determining unit 225.

In the line width error obtaining apparatus 200 shown in FIG. 12, for example, the graph for illustrating the relationship of the signal amounts between the optical image data and the reference image data, as shown in FIG. 8, is created in the line width range determining unit 225. The graph of the optical image data as shown in FIG. 7, that is, the graph for illustrating the relationship between the design data of the line widths and contrast values of the pattern, is stored in the magnetic disk device 119. Further, the relationship between the contrast values and the line width range that is predetermined by performing an experiment is stored in the magnetic disk device 119. For example, the optimum line width range is obtained for every contrast value by experiment and is stored in the magnetic disk device 119 in regards to the optical image data of which the contrast value is decreased by refinement of the line width such as the contrast value and the optimum range (85 nm±3 nm) of the optical image data after the fluctuation of the light quantity, as shown in table 1. The line width range determining unit 225 refers to the above-mentioned graph read by the master control unit 110 from the magnetic disk device 119 when the white level of the optical image data is decreased. Then, if the line width range determining unit 225 determines that the decrease of the contrast value is caused by the fineness of the pattern, the line width range determining unit 225 reads the relationship between the contrast value and the line width range from the magnetic disk device 119 and specifies a new line width range corresponding to the decreased contrast value using the relationship. On the other hand, if the contrast value does not decrease, it is not necessary to set a new line width range, and the latest line width range is maintained.

<Line Width Error (ΔCD) Obtaining Step (S16)>

Next, in the line width error obtaining unit 226, the pattern having the line width included in the line width range registered in the line width range determining unit 225 is extracted. Then, the difference between the line widths (first line widths) of the extracted pattern of the optical image data and the line widths (second line widths) obtained using the edge pair of the pattern of the reference image data corresponding to the pattern of the optical image data is obtained. The obtained difference is a line width error. The line width error is obtained in each frame, as one example.

When a new line width range is determined in the line width range determining unit 225, information regarding the new line width error range is transmitted to the line width error obtaining unit 226. Then, the line width error obtaining unit 226 extracts a pattern in accordance with the new line width range, and obtains a line width error of the extracted patterns. On the other hand, if the light amount quantity does not fluctuate, a line width error is obtained by extracting a pattern according to the latest line width range.

<ΔCD Map Generating Step (S17)>

The ΔCD map generating step (S17) shown in FIG. 13, is performed in the map generating unit 127 shown in FIG. 12. Specifically, the value of the line width error (ΔCD) and the measurement value of the position coordinate of the table 101 (transmitted from the position information unit 113) are transmitted from the line width error obtaining unit 226 to the map generating unit 127. The map generating unit 127 generates a ΔCD map by associating the line width error (ΔCD) with the position coordinate in the mask Ma.

As mentioned above, according to the present embodiment, in the case where optical image data is acquired when a light quantity of a light source fluctuates or a pattern becomes finer, a line width of the pattern to be measured can be accurately measured by changing a threshold value for setting edges that become a starting point and an ending point for the measurement of the line width, depending on the acquired optical image data. Thereby, a line width error can be accurately obtained, and further a ΔCD map can be accurately obtained.

Further, in the present embodiment, a light quantity of the light source is monitored while optical image data is acquired, and a new threshold value is immediately set when the light quantity fluctuates. Therefore, the new threshold value that matches the optical image data changed due to the fluctuation of the light quantity is determined with the acquisition of the optical image data. That is, a line width error can be accurately obtained in real time while the optical image of the pattern is acquired.

Third Embodiment

Figure 14:
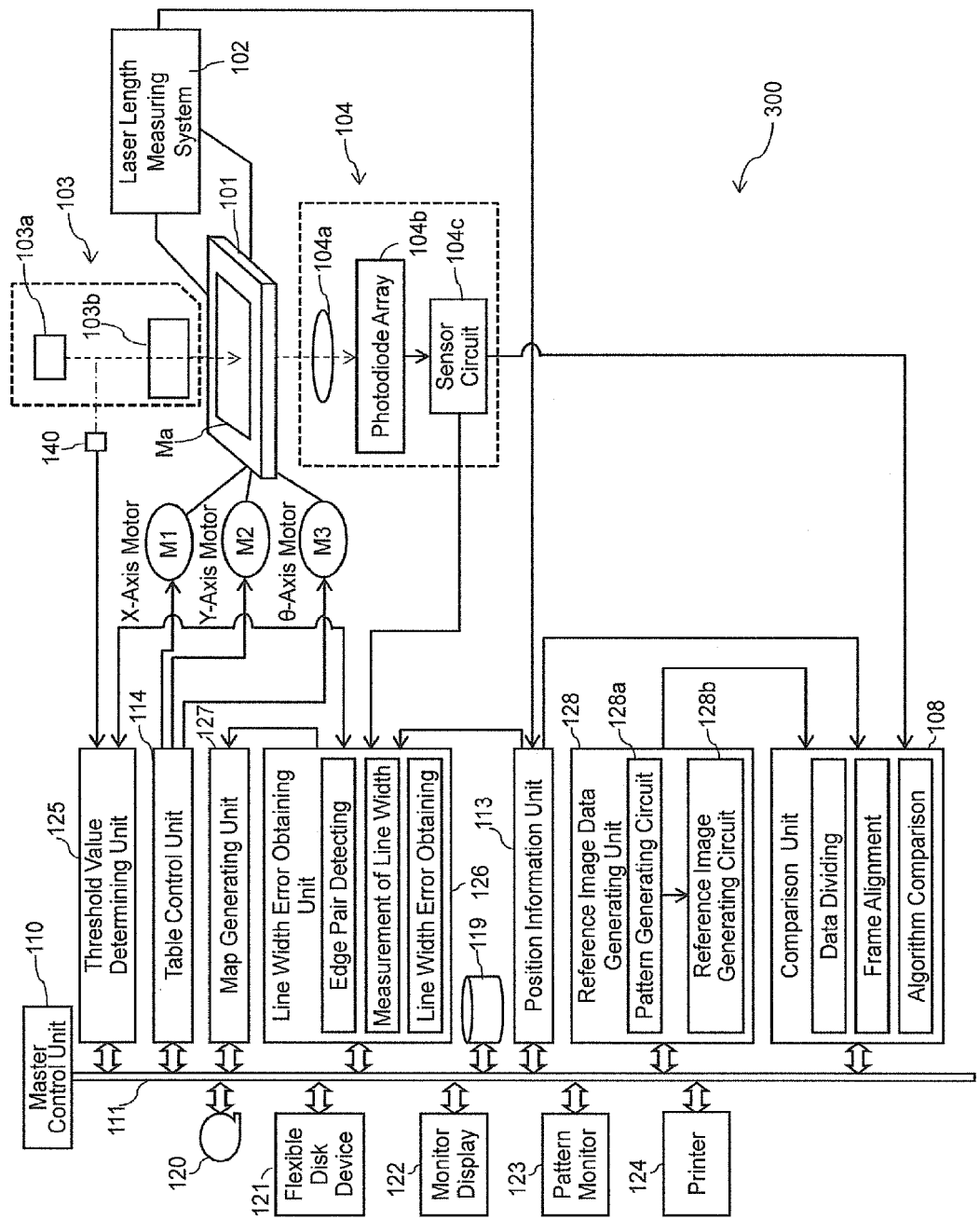
FIG. 14 is a configuration diagram of an inspection system according to the third embodiment.

FIG. 14 is a configuration diagram of an inspection system 300 according to the present embodiment. The inspection system has a configuration similar to that of the line width error obtaining apparatus 100 of the first embodiment shown in FIG. 1. Specifically, the inspection system 300 includes a table configured to be movable in an X-axis direction and a Y-axis direction; a position measuring unit configured to measure a position coordinate of the table; an illumination optical system configured to illuminate light emitted from a light source to a sample on the table; an imaging unit configured to acquire an optical image data of a pattern formed in the sample by causing the light transmitted through the sample or reflected by the sample to be incident on a sensor; a reference image data generating unit configured to generate reference image data corresponding to the optical image data from design data of the pattern; a comparison unit configured to compare the optical image data of the pattern with the reference image data of the pattern, and determine the existence of a defect in the case where a difference value between the optical image and the reference image is larger than a predetermined threshold value; a line width error obtaining unit configured to specify a position of the signal amount of the optical image data equal to a threshold value by internally dividing a minimum value and a maximum value of the signal amount of the reference image data, by a division ratio, as an edge of the pattern of the optical image data, and detect an edge pair consisting of an edge as a starting point for a measurement of a first line width, and another edge as an ending point of the measurement of the first line width, and obtain the first line width of the pattern of the optical image data using the edge pair, and obtain a line width error as a difference between the first line width and a second line width of the pattern obtained using an edge pair of the reference image data corresponding to the edge pair of the optical image data; and a light quantity sensor configured to detect a fluctuation of light quantity of the light source. Instead of the line width error obtaining apparatus 100 the inspection system 300 of the present embodiment may have a configuration similar to that of the line width error obtaining apparatus 200 of the second embodiment shown in FIG. 12. In this case, a line width error obtaining unit specifies a position of a signal amount of the optical image data equal to a threshold value by internally dividing a minimum value and a maximum value of the signal amount of a reference image data generated from design data of the pattern, by a division ratio, as an edge of the pattern of the optical image data, and detects an edge pair consisting of an edge as a starting point for a measurement of any line width of the pattern, and another edge as an ending point of the measurement of the line width, and obtains a plurality of line widths with different design value of the pattern using the edge pairs of the optical image data to specify a line width range including at least one of the line widths, and obtains a line width error as a difference between a first line width included in the line width range, and a second line width of the pattern of the reference image data corresponding to the optical image data of the pattern having the first line width.

Further, the inspection system 300 includes the reference image data generating unit 128 and comparison unit 108 as components for performing processing necessary for an inspection by the die-to-database comparison method based on the optical image of the pattern to be inspected, in addition to common parts of the line width error obtaining apparatus 100. Furthermore, the inspection system 300 also includes, the magnetic tape device 120 as an example of an auxiliary storage device, a flexible disk device 121 to be another example of the auxiliary storage device, a monitor display 122 as an example of a display device, a microscope pattern monitor 123 by an ITV camera as another example of a display device, and a printer 124.

The process of acquiring the optical image data of the mask Ma to be inspected is similar to the case of the line width error obtaining apparatus 100 according to the first embodiment and therefore a repeated description is omitted.

The reference image data corresponding to the optical image data is generated by the reference image data generating unit 128. Here, the reference image data generating unit 128 includes a reference image generating circuit 128b and the pattern generating circuit 128a.

For example, the design pattern data stored in the magnetic disk device 119 is read by the master control unit 110 and is then transmitted to the reference image data generating unit 128. Then, the design pattern data is converted into image data of a binary or multi-image data in the pattern generating circuit 128a. Then, the image data is sent from the pattern generating circuit 128a to the reference image generating circuit 128b. In the reference image generating circuit 128b, the filter process is performed to the image data using the reference image generating function, to generate the reference image data.

In the inspection system 300, the inspection for detecting a defect of the pattern of the mask Ma is performed using the above-mentioned reference image data and the optical image data in the comparison unit 108. Further, the line width error (ΔCD) of the mask Ma is obtained in a line width error obtaining unit 126, which is a common part of the line width error obtaining apparatus 100, furthermore, a ΔCD map is generated in the map generating unit 127. The method for obtaining a line width error and the method for generating a ΔCD map are similar to the method of the first embodiment.

In the comparison unit 108, optical image data output from the imaging unit 104 is divided to the predetermined size, for example, frame data size. The reference image data output from the reference image data generating unit 128 is also divided to the frame data size corresponding to the optical image data. As mentioned below, each optical image data divided to frame data size is called optical frame data, and each reference image data divided to frame data size is called reference frame data.

As mentioned below, a defect of the optical frame data is detected by comparing optical frame data with the reference frame data in the comparison unit 108. Further, position coordinate data of the defect is generated using the measurement data, measured by the laser length measuring system 102, transmitted from the position information unit 113.

The comparison unit 108 includes several tens of comparison parts for processing a plurality of optical frame data along with reference frame data corresponding to each optical frame data, at the same time. Next, after the processing of optical frame data is completed, each comparison part uses unprocessed optical frame data and reference frame data corresponding to unprocessed optical frame data. Thus, a large amount of optical frame data is sequentially processed as mentioned above and therefore a defect or defects will be detected.

The specific process performed by the comparison unit 108 is as follows.

Firstly, the optical frame data and the reference frame data, corresponding to the optical frame data, are output to each comparison unit as one set. Then, in the comparison unit, alignment of the reference frame data and the optical frame data (frame alignment) is performed. In this case, the optical frame data and the reference frame data are parallel shifted in a unit of a pixel (of photodiode array 104*b*), so that the position of the edge of the pattern and the position of the peak position of the brightness are matched, and the optical frame data and the reference frame data are calibrated less than a size of a unit of a pixel, by prorating the brightness of the neighboring pixel.

After finishing the alignment of the reference frame data and the optical frame data, defect detection in accordance with an appropriate comparison algorithm it is performed. For example, evaluation and the level difference between each pixel of the reference frame data and the optical frame data, and comparison of the differential value of pixels in the pattern edge direction is performed. When the difference between the reference image data and the optical image data exceeds the predetermined threshold value, that position is determined to be defective.

For example, the threshold value that is registered as a line width defect is specified in a unit of a measurement difference (nm) and measurement ratio (%) of a line width (CD: Critical Dimension) and the critical dimension ratio between the optical image data and the reference image data. Two kinds of threshold values are specified, the measurement difference of the line width is 16 nm and the measurement ratio is 8%, for example. When the pattern of the optical image data has the line width of 200 nm, if the measurement difference between optical image data and the reference image data is 20 nm, it is determined that this pattern has a defect because the value is greater than either the threshold value of the measurement difference and the threshold value of the measurement ratio.

The threshold value of the determination of a defect can be specified separately, in either the case where the line width is thicker than the reference image data, and the case where the line width is thinner than the reference image data. Further, the threshold value can be specified separately, in either the case where the width of the space between lines (the distance between patterns), instead of the line width, is thicker than the reference image data, and the case where the width of the space between the lines (the distance between the patterns), instead of the line width, is thinner than the reference image data. Further, regarding the pattern having a shape of a hole, a threshold value of the measurement of the diameter of the hole and the threshold value of the measurement ratio of the diameter of the hole can be specified. In this case, the threshold value can be specified for the cross-section of the hole along the X-direction, and a cross-section of the hole along the Y-direction, respectively.

An algorithm used for defect detection, in addition to the above-mentioned may also include, for example, a level comparison method or a differential comparison method. In the level comparison method, for example, the luminance value of the pixel in the optical frame data, namely the luminance value of the region corresponding to the pixel of the photodiode array 104*b* is calculated. Then, the luminance value of the reference frame data and the calculated luminance values are compared, thus, the defect is detected. In the differential comparison method, the direction along the edge of the fine pattern on the optical frame data, for example, the amount of change in the luminance value of the pixel in the direction along the edge of the line pattern is determined by differentiation. By comparing the variation of the brightness value in the change amount and the reference frame data, the defect is detected.

When the comparison unit 108 determines that the optical frame data has a defect, the defect information, such as the optical frame data, the position coordinate data of the defect information of the defect, the compared reference frame data, etc., are registered in the magnetic disk device 119.

The comparison unit 108 performs a plurality of comparison determinations while the condition of the alignment of the frame data is changing. The comparison determination includes the alignment of the frame data, defect detection, and counting the number of defect detections. The comparison unit 108 performs the comparison determination for every set of optical frame data and reference frame data, corresponding to the optical frame data, and for every comparison algorithm. The comparison unit 108 can register the defect detection result having the lowest number of defects detected by the comparison determination in the defect registration unit.

As mentioned above, the optical image data and the reference image data are sequentially input to the comparison unit 108, and a defect detection of the optical image data is performed by comparing the optical image data and the reference image data.

According to the inspection system 300 of the present embodiment, it is possible to carry out a defect detection of a pattern formed on a mask Ma, in parallel with the acquisition of the line width error and the generation of the ΔCD map. Especially, when the line width error is obtained, even if the optical image data, which is different to actual optical image data, is acquired by the fluctuation of the light quantity of a light source or a fineness of a pattern, the line width of the pattern to be inspected is accurately measured by changing a threshold value for determining an edge to be the standard of the measurement of the line width according to the optical image data acquired. Thereby, the correct line width error of the actual optical image data can be obtained, and the accurate ΔCD map of the actual optical image data can also be obtained. Further, according to the present embodiment, the light amount of the light source is monitored while the optical image data is acquired, and a new threshold value is set, when the fluctuation of the light amount of the light source occurs. Therefore, the determination of the threshold value, which matches the optical image data changed by fluctuation of the light amount, can be performed along with the acquisition of the optical image data. That is, while the optical image of the pattern is acquired, an accurate line width error can be obtained in real time.

As mentioned above, the line width error obtaining method, the line width error obtaining apparatus, and the inspection system according to the present invention are mentioned in each embodiment. However, the present invention is not limited to the line width error obtaining method, the line width error obtaining apparatus, and the inspection system mentioned in those embodiments. Various modifications to the present invention, improvements regarding possible combinations, and the like, may be performed. The scope of the present invention encompasses all line width error obtaining methods, line width error obtaining apparatuses, and inspection systems employing the elements of the present invention and variations thereof, which can be designed by those skilled in the art.

Further, the line width error obtaining apparatus and inspection system illustrated in the embodiments includes the necessary components for these embodiments. However, the line width error obtaining apparatus and inspection system of the present invention can also include other well-known components necessary for line width error acquisition and inspection. In the present invention a "unit" can be configured by a program operating on a computer. Alternatively, the "unit" may be constructed by, not only a software program, but also a combination of software, hardware, or firmware. In the case that the "unit" may be constructed by a program, the program can be recorded in a storage unit such as a magnetic disk device. For example, the table control unit 114 shown in FIG. 1 can be configured by an electronic circuit, or by software that can be processed by the master control unit 110. Further, the table control unit 114 can be configured by a combination of the electronic circuit and software that can be processed by the master control unit 110.

Further features of the present invention may be summarized as follows.

According to one aspect of the present invention, a method for obtaining a line width error of a pattern formed in a sample includes acquiring optical image data of a pattern formed in a sample by irradiating the pattern with light emitted from a light source, and causing the light transmitted through the sample or reflected by the sample to be incident on a sensor. Reference image data is generated corresponding to the optical image data from design data of the pattern. A threshold value is specified by internally dividing a minimum value and a maximum value of a signal amount of the reference image data by a division ratio. A position is determined as an edge of the pattern of the reference image data corresponding to the signal amount of the threshold value. A position of the signal amount equal to the threshold value is determined as an edge of the pattern of the optical image data. An edge pair is detected consisting of an edge as a starting point for a measurement of a first line width, and another edge as an ending point of the measurement of the first line width. The first line width of the pattern is obtained using the edge pair of the optical image data. A line width error is obtained as a difference between the first line width and second line width of the pattern obtained using an edge pair of the reference image data corresponding to the edge pair of the optical image data. A new threshold value is specified in the case of fluctuation of a light quantity of the light source or decrease of a contrast value of the optical image data, and a position of the signal amount equal to the new threshold value is determined as an edge of the pattern of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the specifying step for the new threshold value comprises a step for obtaining at least one of a relationship between a fluctuation amount of the light quantity of the light source and an optimum threshold value, and a relationship between a degradation amount of the contrast value and the optimum threshold value, by performing an experiment; and specifying the new threshold value according to at least one of these relationships.

According to another aspect of the present invention, a method for obtaining a line width error of a pattern formed in a sample includes acquiring optical image data of a pattern formed in a sample by irradiating the pattern with light emitted from a light source, and causing the light transmitted through the sample or reflected by the sample to be incident on a sensor. Reference image data is generated corresponding to the optical image data from design data of the pattern. A threshold value is specified by internally dividing a minimum value and a maximum value of a signal amount of the reference image data by a division ratio. A position is determined as an edge of the pattern of the reference image data corresponding to the signal amount of the threshold value. A position of the signal amount equal to the threshold value is determined as an edge of the pattern of the optical image data. An edge pair is detected consisting of an edge as a starting point for a measurement of any line width of the pattern, and another edge as an ending point of the measurement of the line width. A plurality of line widths having different design values of the pattern is obtained using the edge pair of the optical image data. A line width range including at least one of the line widths of the pattern is specified. A pattern is extracted having a line width included in the line width range. A line width error is obtained as a difference between a first line width included in the line width range, and a second line width of the pattern of the reference image data corresponding to the optical image data of the pattern having the first line width. A new line width range is specified in the case of fluctuation of a light quantity of the light source or decrease of a contrast value of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the specifying step for the new threshold value comprises a step for obtaining at least one of a relationship between a fluctuation amount of the light quantity of the light source and an optimum threshold value, and a relationship between a degradation amount of the contrast value and the optimum threshold value, by performing an experiment, and specifying the new threshold value according to at least one of these relationships.

According to another aspect of the present invention, an apparatus for obtaining a line width error of a pattern formed in a sample includes a table, a position measuring unit, an illumination optical system, an imaging unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The line width error obtaining unit specifies a position of the signal amount of the optical image data equal to a threshold value by internally dividing a minimum value and a maximum value of the signal amount of a reference image data generated from design data of the pattern, by a division ratio, as an edge of the pattern of the optical image data. The line width error obtaining unit further detects an edge pair consisting of an edge as a starting point for a measurement of a first line width, and another edge as an ending point of the measurement of the first line width, obtains the first line width of the pattern of the optical image data using the edge pair, and further obtains a line width error as a difference between the first line width and a second line width of the pattern obtained using an edge pair of the reference image data corresponding to the edge pair of the optical image data. The light quantity sensor detects a fluctuation of light quantity of the light source. The line width error obtaining unit further specifies a new threshold value in the case where the light quantity sensor detects the fluctuation of the light quantity of the light source, and further determines a position of the signal amount equal to the new threshold value as an edge of the pattern of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the line width error of a pattern formed in a sample obtaining apparatus further comprises a map generating unit configured to generate a map of the line width error corresponding to the position coordinate of the sample using information of the position coordinate of the table output from the position measuring unit.

According to another aspect of the present invention, an apparatus for obtaining a line width error of a pattern formed in a sample includes a table, a position measuring unit, an illumination optical system, an imaging unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The line width error obtaining unit specifies a position of a signal amount of the optical image data, equal to a threshold value by internally dividing a minimum value and a maximum value of the signal amount of a reference image data generated from design data of the pattern, by a division ratio, as an edge of the pattern of the optical image data, and detects an edge pair consisting of an edge as a starting point for a measurement of any line width of the pattern, and another edge as an ending point of the measurement of the line width, and obtain a plurality of line widths with different design value of the pattern using the edge pairs of the optical image data to specify a line width range including at least one of the line widths, and obtains a line width error as a difference between a first line width included in the line width range, and a second line width of the pattern of the reference image data corresponding to the optical image data of the pattern having the first line width. The line width error obtaining unit further detects an edge pair consisting of an edge as a starting point for a measurement of a first line width, and another edge as an ending point of the measurement of the first line width, obtains the first line width of the pattern of the optical image data using the edge pair, and further obtains a line width error as a difference between the first line width and a second line width of the pattern obtained using an edge pair of the reference image data corresponding to the edge pair of the optical image data. The light quantity sensor detects a fluctuation of light quantity of the light source. The line width error obtaining unit further specifies a new threshold value in the case where the light quantity sensor detects the fluctuation of the light quantity of the light source, and further determines a position of the signal amount equal to the new threshold value as an edge of the pattern of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the line width error of a pattern formed in a sample obtaining apparatus further comprises a map generating unit configured to generate a map of the line width error corresponding to the position coordinate of the sample using information of the position coordinate of the table output from the position measuring unit.

According to another aspect of the present invention, an inspection system includes a table, a position measuring unit, an illumination optical system, an imaging unit, a reference image data generating unit, a comparison unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The reference image data generating unit generates reference image data corresponding to the optical image data from design data of the pattern. The comparison unit compares the optical image data of the pattern with the reference image data of the pattern, and further determines the existence of a defect in the case where a difference value between the optical image and the reference image is larger than a predetermined threshold value. The line width error obtaining unit specifies a position of the signal amount of the optical image data equal to a threshold value by internally dividing a minimum value and a maximum value of the signal amount of a reference image data, by a division ratio, as an edge of the pattern of the optical image data. The line width error obtaining unit further detects an edge pair consisting of an edge as a starting point for a measurement of a first line width, and another edge as an ending point of the measurement of the first line width, and further obtains the first line width of the pattern of the optical image data using the edge pair, and further obtains a line width error as a difference between the first line width and a second line width of the pattern obtained using an edge pair of the reference image data corresponding to the edge pair of the optical image data. A light quantity sensor detects a fluctuation of light quantity of the light source. The line width error obtaining unit further specifies a new threshold value in the case of the light quantity sensor detecting the fluctuation of the light quantity of the light source, and determines a position of the signal amount equal to the new threshold value as an edge of the pattern of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the inspection system further comprises a map generating unit configured to generate a map of the line width error corresponding to the position coordinate of the sample using information of the position coordinate of the table output from the position measuring unit.

According to another aspect of the present invention, an inspection system includes a table, a position measuring unit, an illumination optical system, an imaging unit, a reference image data generating unit, a comparison unit, a line width error obtaining unit, and a light quantity sensor. The table is movable in an X-axis direction and a Y-axis direction. The position measuring unit measures a position coordinate of the table. The illumination optical system illuminates light emitted from a light source to a sample on the table. The imaging unit acquires an optical image data of a pattern formed in the sample by causing the light transmitted through the sample or reflected by the sample to be incident on a sensor. The reference image data generating unit generates reference image data corresponding to the optical image data from design data of the pattern. The comparison unit compares the optical image data of the pattern with the reference image data of the pattern, and further determines the existence of a defect in the case where a difference value between the optical image and the reference image is larger than a predetermined threshold value. The line width error obtaining unit specifies a position of a signal amount of the optical image data equal to a threshold value by internally dividing a minimum value and a maximum value of the signal amount of a reference image data generated from design data of the pattern, by a division ratio, as an edge of the pattern of the optical image data, and detects an edge pair consisting of an edge as a starting point for a measurement of any line width of the pattern, and another edge as an ending point of the measurement of the line width, and obtains a plurality of line widths with different design value of the pattern using the edge pairs of the optical image data to specify a line width range including at least one of the line widths, and obtain a line width error as a difference between a first line width included in the line width range, and a second line width of the pattern of the reference image data corresponding to the optical image data of the pattern having the first line width. A light quantity sensor detects a fluctuation of light quantity of the light source. The line width error obtaining unit further specifies a new threshold value in the case of the light quantity detecting the fluctuation of the light quantity of the light source, and determines a position of the signal amount equal to the new threshold value as an edge of the pattern of the optical image data.

In the above-mentioned embodiment, it is preferable that consecutive values between the minimum value and the maximum value are split into two groups by the division ratio taking the threshold value as a boundary.

Further in the above-mentioned embodiment, it is preferable that the inspection system further comprises a map generating unit configured to generate a map of the line width error corresponding to the position coordinate of the sample using information of the position coordinate of the table output from the position measuring unit.

What is claimed is:

1. A line width error of a pattern formed in a sample obtaining method comprising:
   acquiring optical image data of a pattern formed in a sample by irradiating the pattern with light emitted from a light source, and causing the light transmitted through the sample or reflected by the sample to be incident on a sensor;
   generating reference image data corresponding to the optical image data from design data of the pattern;
   specifying a threshold value by internally dividing a minimum value and a maximum value of a signal amount of the reference image data by a division ratio, and determining a position corresponding to the signal amount of the threshold value as an edge of the pattern of the reference image data;
   determining a position of the signal amount equal to the threshold value as an edge of the pattern of the optical image data, and detecting an edge pair consisting of an edge as a starting point for a measurement of a first line width of the pattern, and another edge as an ending point of the measurement of the first line width;
   obtaining the first line width of the pattern using the edge pair of the optical image data, and obtaining a line width error as a difference between the first line width and a second line width of the pattern obtained using an edge pair of the reference image data corresponding to the edge pair of the optical image data; and
   wherein a new threshold value is specified in the case of fluctuation of a light quantity of the light source or decrease of a contrast value of the optical image data, and a position of the signal amount equal to the new threshold value is determined as an edge of the pattern of the optical image data.

2. The line width error of a pattern formed in a sample obtaining method according to claim 1, wherein consecutive values between the minimum value and the maximum value are split into two groups by the division ratio taking the threshold value as a boundary.

3. The line width error of a pattern formed in a sample obtaining method according to claim 1,
   wherein the specifying step for the new threshold value comprises,
      obtaining at least one of a relationship between a fluctuation amount of the light quantity of the light source and an optimum threshold value, and a relationship between a degradation amount of the contrast value and the optimum threshold value, by performing an experiment; and specifying the new threshold value according to at least one of these relationships.

4. A line width error of a pattern formed in a sample obtaining method comprising:
   acquiring optical image data of a pattern formed in a sample by irradiating the pattern with light emitted from a light source, and causing the light transmitted through the sample or reflected by the sample to be incident on a sensor;
   generating reference image data corresponding to the optical image data from design data of the pattern;
   specifying a threshold value by internally dividing a minimum value and a maximum value of a signal amount of the reference image data by a division ratio, and determining a position corresponding to the signal amount of the threshold value as an edge of the pattern of the reference image data;
   determining a position of the signal amount equal to the threshold value as an edge of the pattern of the optical image data, and detecting an edge pair consisting of an edge as a starting point for a measurement of any line width of the pattern, and another edge as an ending point of the measurement of the line width;
   obtaining a plurality of line widths having different design values of the pattern using the edge pairs of the optical image data;

specifying a line width range including at least one of the line widths;

obtaining a line width error as a difference between a first line width included in the line width range, and a second line width of the pattern of the reference image data corresponding to the optical image data of the pattern having the first line width; and wherein a new line width range is specified in the case of fluctuation of a light quantity of the light source or decrease of a contrast value of the optical image data.

5. The line width error of a pattern formed in a sample obtaining method according to claim 4, wherein consecutive values between the minimum value and the maximum value are split into two groups by the division ratio taking the threshold value as a boundary.

6. The line width error of a pattern formed in a sample obtaining method according to claim 4, wherein the specifying step for the new threshold value comprises, obtaining at least one of a relationship between a fluctuation amount of the light quantity of the light source and an optimum threshold value, and a relationship between a degradation amount of the contrast value and the optimum threshold value, by performing an experiment, and specifying the new threshold value according to at least one of these relationships.

7. A line width error of a pattern formed in a sample obtaining apparatus comprising:

a table configured to be movable in an X-axis direction and a Y-axis direction;

a position measuring unit configured to measure a position coordinate of the table;

an illumination optical system configured to illuminate light emitted from a light source to a sample on the table;

an imaging unit configured to acquire an optical image data of a pattern formed in the sample by causing the light transmitted through the sample or reflected by the sample to be incident on a sensor;

a line width error obtaining unit configured to specify a position of the signal amount of the optical image data equal to a threshold value by internally dividing a minimum value and a maximum value of the signal amount of a reference image data generated from design data of the pattern, by a division ratio, as an edge of the pattern of the optical image data, and detect an edge pair consisting of an edge as a starting point for a measurement of a first line width, and another edge as an ending point of the measurement of the first line width, and obtain the first line width of the pattern of the optical image data using the edge pair, and obtain a line width error as a difference between the first line width and a second line width of the pattern obtained using an edge pair of the reference image data corresponding to the edge pair of the optical image data;

a light quantity sensor configured to detect a fluctuation of light quantity of the light source; and wherein the line width error obtaining unit specifies a new threshold value in the case of the light quantity sensor detecting the fluctuation of the light quantity of the light source, and determines a position of the signal amount equal to the new threshold value as an edge of the pattern of the optical image data.

8. The line width error of a pattern formed in a sample obtaining method according to claim 7, wherein consecutive values between the minimum value and the maximum value are split into two groups by the division ratio taking the threshold value as a boundary.

9. The line width error of a pattern formed in a sample obtaining apparatus according to claim 7, further comprising a map generating unit configured to generate a map of the line width error corresponding to the position coordinate of the sample using information of the position coordinate of the table output from the position measuring unit.

10. A line width error of a pattern formed in a sample obtaining apparatus comprising:

a table configured to be movable in an X-axis direction and a Y-axis direction;

a position measuring unit configured to measure a position coordinate of the table;

an illumination optical system configured to illuminate light emitted from a light source to a sample on the table;

an imaging unit configured to acquire an optical image data of a pattern formed in the sample by causing the light transmitted through the sample or reflected by the sample to be incident on a sensor;

a line width error obtaining unit configured to specify a position of a signal amount of the optical image data, equal to a threshold value by internally dividing a minimum value and a maximum value of the signal amount of a reference image data generated from design data of the pattern, by a division ratio, as an edge of the pattern of the optical image data, and detect an edge pair consisting of an edge as a starting point for a measurement of any line width of the pattern, and another edge as an ending point of the measurement of the line width, and obtain a plurality of line widths with different design value of the pattern using the edge pairs of the optical image data to specify a line width range including at least one of the line widths, and obtain a line width error as a difference between a first line width included in the line width range, and a second line width of the pattern of the reference image data corresponding to the optical image data of the pattern having the first line width;

a light quantity sensor configured to detect a fluctuation of light quantity of the light source; and wherein the line width error obtaining unit specifies a new line width range in the case of the light quantity sensor detecting the fluctuation of the light quantity of the light source.

11. The line width error of a pattern formed in a sample obtaining apparatus according to claim 10, wherein consecutive values between the minimum value and the maximum value are split into two groups by the division ratio taking the threshold value as a boundary.

12. The line width error of a pattern formed in a sample obtaining apparatus according to claim 10, further comprising a map generating unit configured to generate a map of the line width error corresponding to the position coordinate of the sample using information of the position coordinate of the table output from the position measuring unit.

13. An inspection system comprising:

a table configured to be movable in an X-axis direction and a Y-axis direction;

a position measuring unit configured to measure a position coordinate of the table;

an illumination optical system configured to illuminate light emitted from a light source to a sample on the table;

an imaging unit configured to acquire an optical image data of a pattern formed in the sample by causing the light transmitted through the sample or reflected by the sample to be incident on a sensor;

a reference image data generating unit configured to generate reference image data corresponding to the optical image data from design data of the pattern;

a comparison unit configured to compare the optical image data of the pattern with the reference image data of the pattern, and determine the existence of a defect in the case where a difference value between the optical image and the reference image is larger than a predetermined threshold value;

a line width error obtaining unit configured to specify a position of the signal amount of the optical image data equal to a threshold value by internally dividing a minimum value and a maximum value of the signal amount of the reference image data, by a division ratio, as an edge of the pattern of the optical image data, and detect an edge pair consisting of an edge as a starting point for a measurement of a first line width, and another edge as an ending point of the measurement of the first line width, and obtain the first line width of the pattern of the optical image data using the edge pair, and obtain a line width error as a difference between the first line width and a second line width of the pattern obtained using an edge pair of the reference image data corresponding to the edge pair of the optical image data; and a light quantity sensor configured to detect a fluctuation of light quantity of the light source; and wherein the line width error obtaining unit specifies a new threshold value in the case of the light quantity sensor detecting the fluctuation of the light quantity of the light source, and determines a position of the signal amount equal to the new threshold value as an edge of the pattern of the optical image data.

14. The inspection system according to claim 13, wherein consecutive values between the minimum value and the maximum value are split into two groups by the division ratio taking the threshold value as a boundary.

15. The inspection system according to claim 13, further comprising a map generating unit configured to generate a map of the line width error corresponding to the position coordinate of the sample using information of the position coordinate of the table output from the position measuring unit.

16. An inspection system comprising:

a table configured to be movable in an X-axis direction and a Y-axis direction;

a position measuring unit configured to measure a position coordinate of the table;

an illumination optical system configured to illuminate light emitted from a light source to a sample on the table;

an imaging unit configured to acquire an optical image data of a pattern formed in the sample by causing the light transmitted through the sample or reflected by the sample to be incident on a sensor;

a reference image data generating unit configured to generate reference image data corresponding to the optical image data from design data of the pattern;

a comparison unit configured to compare the optical image data of the pattern with the reference image data of the pattern, and determine the existence of a defect in the case where a difference value between the optical image and the reference image is larger than a predetermined threshold value;

a line width error obtaining unit configured to specify a position of a signal amount of the optical image data equal to a threshold value by internally dividing a minimum value and a maximum value of the signal amount of a reference image data generated from design data of the pattern, by a division ratio, as an edge of the pattern of the optical image data, and detect an edge pair consisting of an edge as a starting point for a measurement of any line width of the pattern, and another edge as an ending point of the measurement of the line width, and obtain a plurality of line widths with different design value of the pattern using the edge pairs of the optical image data to specify a line width range including at least one of the line widths, and obtain a line width error as a difference between a first line width included in the line width range, and a second line width of the pattern of the reference image data corresponding to the optical image data of the pattern having the first line width;

a light quantity sensor configured to detect a fluctuation of light quantity of the light source; and wherein the line width error obtaining unit specifies a new line width range in the case of the light quantity sensor detecting the fluctuation of the light quantity of the light source.

17. The inspection system according to claim 16, wherein consecutive values between the minimum value and the maximum value are split into two groups by the division ratio taking the threshold value as a boundary.

18. The inspection system according to claim 16, further comprising a map generating unit configured to generate a map of the line width error corresponding to the position coordinate of the sample using information of the position coordinate of the table output from the position measuring unit.

* * * * *